(12) United States Patent
Sathavalli et al.

(10) Patent No.: US 11,416,354 B2
(45) Date of Patent: Aug. 16, 2022

(54) TECHNIQUES FOR PROVIDING INTERSITE HIGH AVAILABILITY OF DATA NODES IN A VIRTUAL CLUSTER

(71) Applicant: EMC IP Holding Company LLC, Hopkinton, MA (US)

(72) Inventors: Bharadwaj R. Sathavalli, Bangalore (IN); Shampavman Chenjeri Gururajarao, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 376 days.

(21) Appl. No.: 16/561,406

(22) Filed: Sep. 5, 2019

(65) Prior Publication Data

US 2021/0073089 A1 Mar. 11, 2021

(51) Int. Cl.
| | | |
|---|---|---|
| *G06F 11/20* | (2006.01) | |
| *G06F 11/07* | (2006.01) | |
| *G06F 11/14* | (2006.01) | |
| *G06F 9/455* | (2018.01) | |
| *G06F 3/06* | (2006.01) | |

(52) U.S. Cl.
CPC .......... *G06F 11/2023* (2013.01); *G06F 3/065* (2013.01); *G06F 3/067* (2013.01); *G06F 3/0619* (2013.01); *G06F 3/0664* (2013.01); *G06F 3/0683* (2013.01); *G06F 9/45558* (2013.01); *G06F 11/0793* (2013.01); *G06F 11/1471* (2013.01); *G06F 2009/45562* (2013.01); *G06F 2009/45591* (2013.01)

(58) Field of Classification Search
CPC ............. G06F 11/2023; G06F 11/0793; G06F 11/1471; G06F 3/0619; G06F 3/065; G06F 3/067; G06F 3/0683; G06F 3/0664; G06F 9/45558; G06F 2009/45562; G06F 2009/45591
See application file for complete search history.

(56) References Cited

U.S. PATENT DOCUMENTS

| | | |
|---|---|---|
| 5,544,347 A | 8/1996 | Yanai et al. |
| 5,742,792 A | 4/1998 | Yanai et al. |
| 7,054,883 B2 | 5/2006 | Meiri et al. |
| 7,949,637 B1 | 5/2011 | Burke |
| 9,152,349 B2 | 10/2015 | Yochai |
| 2004/0243650 A1 * | 12/2004 | McCrory ............ G06F 11/2069 |

(Continued)

*Primary Examiner* — Jigar P Patel
(74) *Attorney, Agent, or Firm* — Muirhead and Saturnelli, LLC

(57) ABSTRACT

Creating and using a virtual cluster may include: creating a first cluster logical device on a first data storage system including data nodes; creating a second cluster logical device on a second data storage system including data nodes; configuring the first cluster logical device and the second cluster logical device as a same first logical device; establishing bidirectional remote replication between the first and second cluster logical devices; determining pairs of data nodes including a data node from the first data storage system and another data node from the second data storage system; determining a failure of a first data node on the first data storage system, wherein one of the pairs of data nodes includes the first data node and a second data node of the second data storage system; and responsive to determining the failure of the first data node, performing failover processing by the second data node.

14 Claims, 17 Drawing Sheets

(56) References Cited

U.S. PATENT DOCUMENTS

| | | | |
|---|---|---|---|
| 2005/0125557 A1* | 6/2005 | Vasudevan | G06F 11/2038 709/239 |
| 2011/0307886 A1* | 12/2011 | Thanga | G06F 9/5077 718/1 |
| 2020/0250133 A1* | 8/2020 | Bono | G06F 16/13 |

* cited by examiner

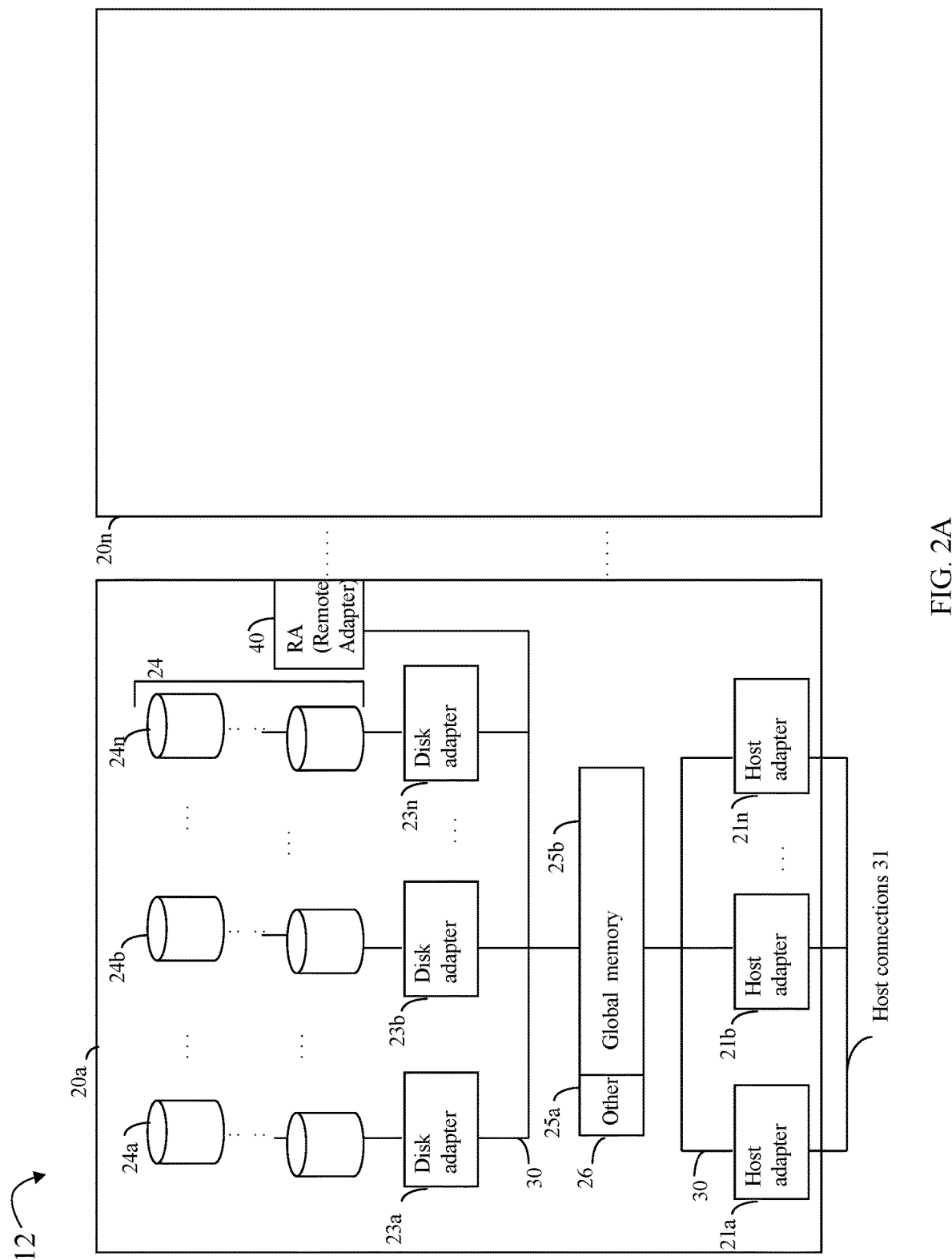

TECHNIQUES FOR PROVIDING INTERSITE HIGH AVAILABILITY OF DATA NODES IN A VIRTUAL CLUSTER

BACKGROUND

Technical Field

This application generally relates to data storage and more particularly to techniques for providing intersite high availability of data nodes.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for creating and using a virtual cluster of a plurality of data storage systems. Such techniques may include: creating a first cluster logical device on a first data storage system including a first plurality of data nodes; creating a second cluster logical device on a second data storage system including a second plurality of data nodes; configuring the first cluster logical device and the second cluster logical device as a same first logical device; establishing bidirectional remote replication between the first cluster logical device and the second cluster logical device; determining a plurality of pairs of data nodes, wherein each pair of the plurality of pairs includes a one data node from the first data storage system and another data node from the second data storage system; determining a failure of a first data node on the first data storage system, wherein one of the plurality of pairs of data nodes include the first data node and a second data node of the second data storage system; and responsive to determining the failure of the first data node, performing failover processing by the second data node. The first cluster logical device and the second cluster logical device may be logically viewed by a cluster manager component on the first data storage system as a single virtual cluster logical device. The first cluster logical device and the second cluster logical device may be logically viewed by the first plurality of data nodes on the first data storage system and by the second plurality of data nodes on the second data storage system as a single virtual cluster logical device. The first data storage system and the second data storage system may be included in the virtual cluster. The first plurality of nodes of the first data storage system and the second plurality of nodes of the second data storage system may be included in the virtual cluster. The first plurality of data nodes and the second plurality of data nodes are file servers executing in a context of virtual machines on processors of the first data storage system and the second data storage system.

In at least one embodiment, the single virtual cluster logical device may include a plurality of partitions, wherein each data node of the first plurality of data nodes and the second plurality of data nodes may be assigned a different one of the plurality of partitions including state information regarding said each data node, and wherein each data node of the first plurality of data nodes and the second plurality of data nodes may have read and write access to the single virtual cluster logical device. Each data node of the first plurality of data nodes and the second plurality of data nodes may periodically write a timestamp to one of the plurality of partitions assigned to the data node. Determining the failure of the first data node on the first data storage system may include determining that the first data node has not written a timestamp within a specified maximum amount of time to a first of the plurality of partitions of the virtual cluster logical device assigned to the first data node.

In at least one embodiment, a log file of the first data node may be stored in the first partition of the virtual cluster logical device assigned to the first data node, and wherein the failover processing performed by the second data node may include: reading the log file from the first partition assigned to the first data node; and replaying the log file of the first data node stored in the first partition of the virtual cluster logical device configured as the same first logical device as the second cluster logical device. The log file may include a plurality of logged write operations having write data that has not yet been written to physical storage, and wherein replaying the log file may include writing out the write data of the plurality of logged write operations to physical storage. One or more logical devices may be exported through the first data node prior to failure, and the one or more logical devices may provide storage for one or more file systems mounted by a host. The log file may include a write operation that writes first data to a file in a first of the file systems mounted by the host, and wherein prior to failure of the first data node, the host may send the write operation to the first data node. Failover processing performed by the second data node may include exporting the one or more logical devices through the second data node. Subsequent to the second data node completing the failover processing, the one or more logical devices exported through the second data node may be mounted by the host as the one or more file systems by the host.

BRIEF DESCRIPTION OF THE DRAWINGS

Features and advantages of the techniques herein will become more apparent from the following detailed description of exemplary embodiments thereof taken in conjunction with the accompanying drawings in which:

FIG. 2A is an example of an embodiment of a data storage system;

DETAILED DESCRIPTION OF EMBODIMENT(S)

Figure 1:
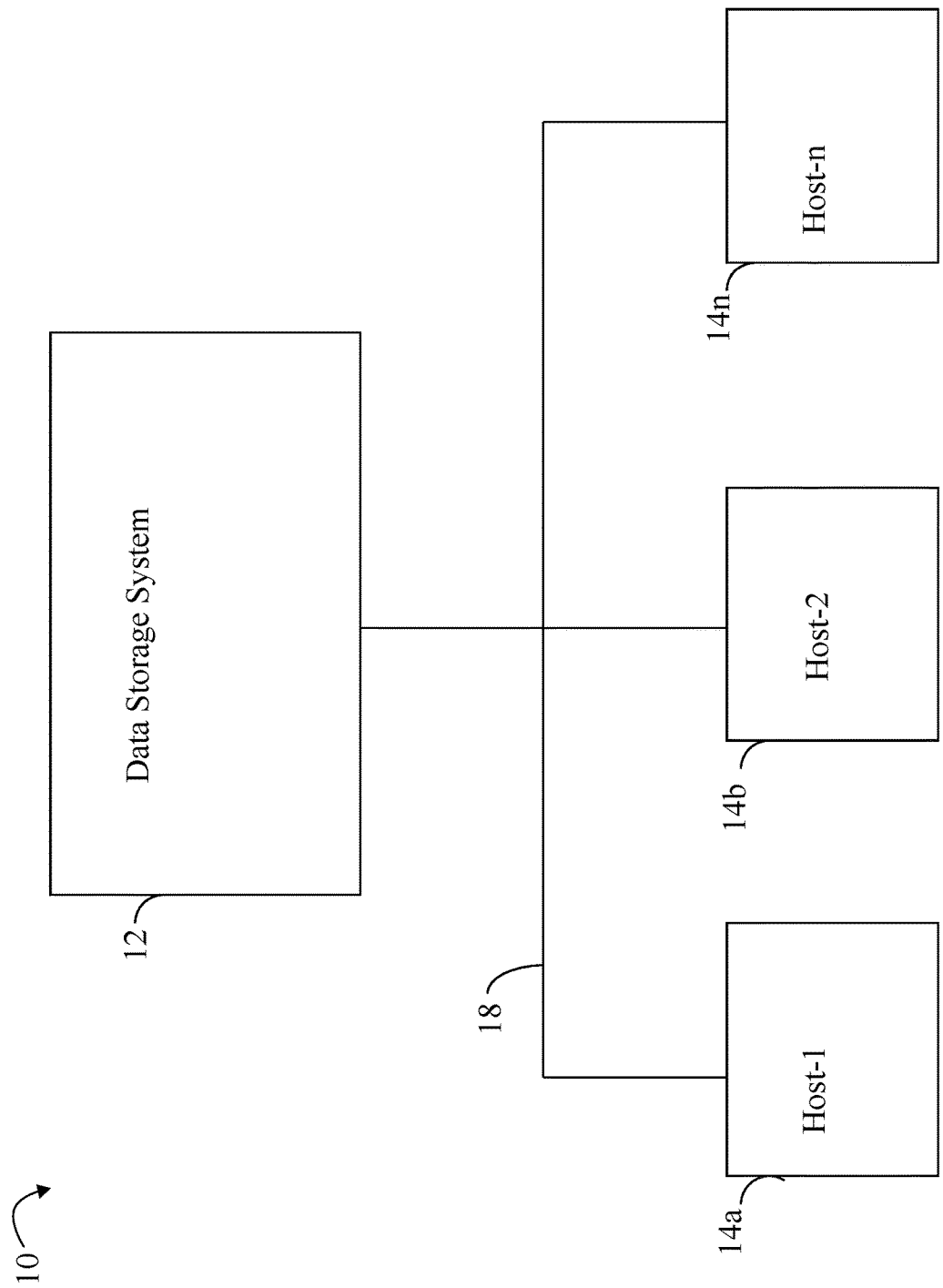
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
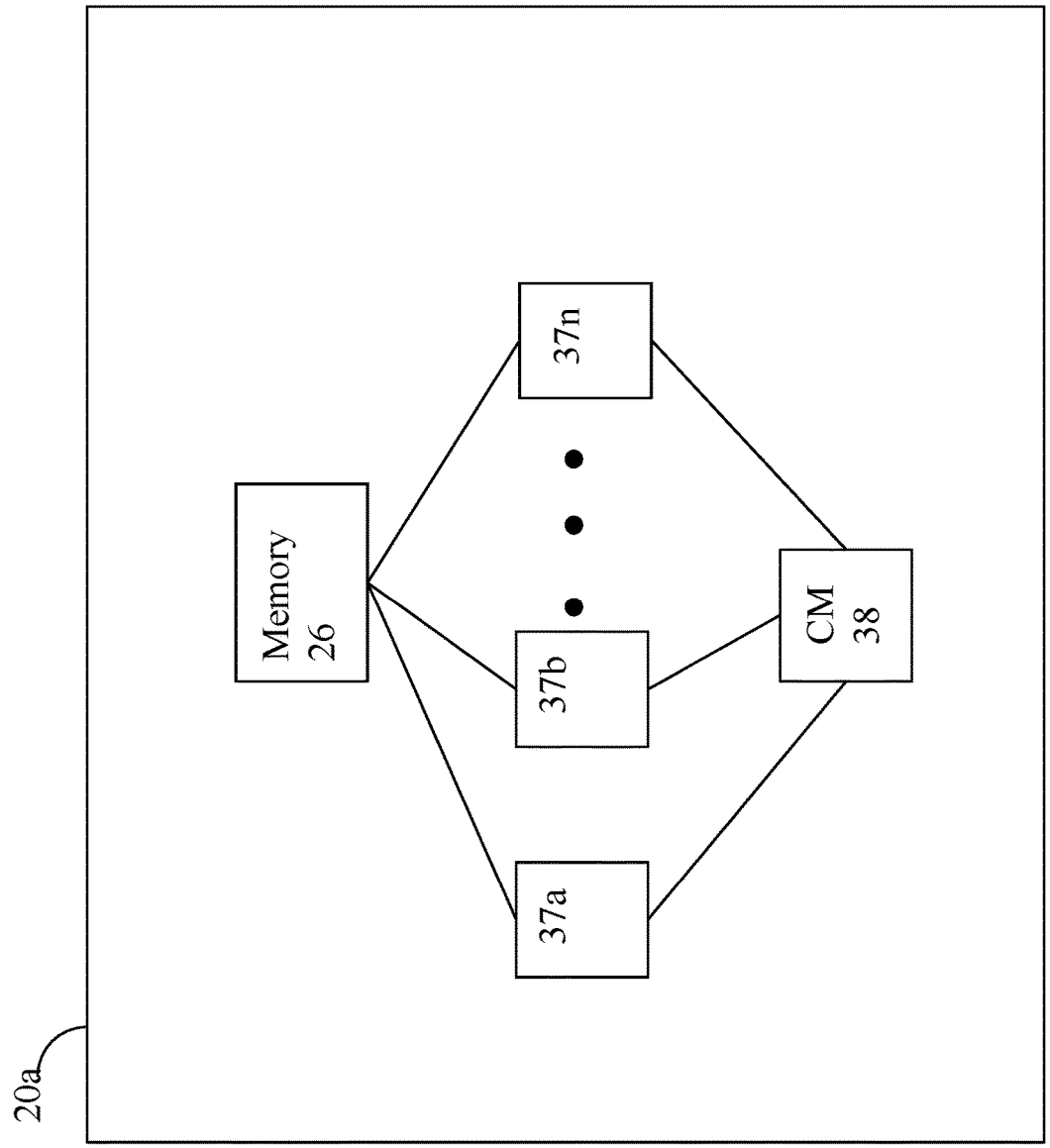
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The data storage system may provide various data services. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). Examples of block-based replication facilities or services that may be included in an embodiment in accordance with the techniques herein are described in more detail elsewhere herein.

Remote replication may be used as part of a disaster recovery (DR) solution. In connection with file systems, the file system and its associated data stored on a primary data storage system or site may be remotely replicated to a second different data storage system or site. Upon the occurrence of a disaster at the primary system or site, processing is performed to bring up the remote second site or system to take over processing performed by the failed primary system or site. The processing performed to bring up the remote site may include rebuilding the file system and its associated configuration on the remote site. The recovery time objective (RTO) is the duration of time and a service level within which a business process must be restored after a disaster in order to avoid unacceptable consequences associated with a break in continuity. For a DR solution as noted above with the remote site, the amount of time that elapses from failure of the primary site to when the second remote site is operable for use in servicing client requests may be large and may be increased based on the number of file system objects. Additionally, the amount of time until the second remote site is operable to service requests may be further increased due to the complexity and orchestration that needs to occur. For example, the primary site first needs to fail, the failure of the primary site is then detected, and then processing commences to failover to the second remote system. Thus, in general, existing DR solutions such as noted above may have an unacceptably high RTO, require complex orchestration and coordination, and may require additional components to handle monitoring sites or systems for failure detection and handling such complex orchestration coordination. Such existing DR solutions may provide intersite recovery solutions.

Within a single site or data storage system, high availability (HA) techniques may be utilized. For example, within a single data storage system or site, a primary component may be paired with a backup or secondary component. Upon failure of the primary component, the backup or secondary component may subsequently handle processing that would have otherwise been handled by the failed primary component. Local intrasite HA techniques generally have a much lower RTO than intersite DR solutions.

Described in following paragraphs are techniques that may be used to extend local intrasite HA techniques for use between systems or sites thereby providing intersite HA but without the increased or larger RTO typically associated with intersite DR solutions. In at least one embodiment, a cluster is defined that includes data nodes spanning multiple sites or systems. In one aspect, the cluster may be characterized as stretched cluster that is a virtual or logical cluster of the data nodes spanning multiple sites or systems. The data nodes of the multiple sites or systems may all read from, and write to, the same virtual or logically configured cluster LUN. In at least one embodiment in which the data nodes of the single cluster are located on two systems or sites, the same virtual or logically configured cluster LUN may be implemented using two LUNs—a first LUN on the first system and a second LUN on the second system. The first LUN and the second LUN may be configured as the same logical device or LUN, such as having the same properties or attributes. For example, the first LUN and the second LUN may both be configured to have the same device identifier, such as the same WWN (world wide name). Thus, both the first LUN and the second LUN may be exposed, exported or visible outside of the data storage systems as the same cluster LUN. For example, from the host or client viewpoint, or more generally, externally outside the first and second systems, both the first LUN and the second LUN are identified as the same LUN.

Also, both the first LUN and the second LUN may be identified as the same LUN by data nodes of the cluster, and of the first and second systems, through remote replication. The first LUN and the second LUN may be configured as remote mirrors of one another. The first LUN and the second LUN may be configured for bidirectional or two-way remote replication whereby writes to the first LUN are automatically replicated to the second LUN, and writes to the second LUN are automatically replicated to the first LUN. In this manner, first data nodes of the first system may write first data to the first LUN which is replicated on the second LUN. Second data nodes of the second system may read the first data as stored on the second LUN. In a similar manner, the second data nodes of the second system may write second data to the second LUN which is replicated on the first LUN. The first data nodes of the first system may read the second data as stored on the first LUN. Based on the foregoing data nodes across the first and the second systems may all have access to the same set of information stored collectively on both the first LUN and the second LUN and give the appearance to the data nodes that the collective information of both the first LUN and the second LUN are the same cluster LUN.

In at least one embodiment, the first data nodes of the first system use the first LUN as a first cluster LUN, and the second data nodes of the second system use the second LUN as a second cluster LUN. Through the established automated bidirectional remote replication between the first cluster LUN and the second cluster LUN, the first cluster LUN and the second cluster LUN are collectively exposed to the first data nodes and the second data nodes as the same single cluster LUN. In this manner, the first data nodes and the second data nodes are all included in the same logical or virtual cluster having the same single cluster LUN. In such an embodiment, HA may be achieved by configuring pairs of partner data nodes on both the first and the second systems. For example, a HA pair of data nodes may include a first data node from the first system and a second data node of the second system. If the first data node of the first system fails, its partner second data node of the second system may take over processing for the first failed data node. In addition to establishing bidirectional remote replication for the virtual or logically configured single cluster LUN, an embodiment may similarly configure any needed data LUNs used by the data nodes for bidirectional remote replication between the first and second systems.

In at least one embodiment, cluster membership may be determined by having read and write access to the virtual or logically configured single cluster LUN implemented using the first LUN and the second LUN configured for remote bidrectional replication. Thus, each data node having such access to either the first LUN of the first system or the second LUN of the second system may be included in the same logical or virtual cluster. In at least one embodiment, each of the data nodes may be a file server. More generally, a data node may be any suitable application.

The management of the virtual cluster spanning multiple data storage systems and having a single virtual cluster LUN in an embodiment in accordance with the techniques herein may be performed using any suitable cluster management technique. Generally, cluster management for the virtual cluster of data nodes includes monitoring the data nodes, detecting when a data node fails, and handling failover of the failed data node to another data node of the cluster (e.g., the other data node takes over processing of the failed data node). For example, an embodiment may use a separate component, such as a cluster manager, to handle management of the virtual cluster. The cluster manager may also execute in the context of a VM on a processor of one of the data storage systems. As another example, an embodiment may have the data nodes of the virtual cluster perform self management rather than have a separate cluster manager component. In this latter embodiment, the data nodes themselves handle cluster management.

The foregoing and other aspects of the techniques herein are described in more detail in following paragraphs.

In following paragraphs, initial discussion is provided regarding file servers and remote replication that may be used in an embodiment in accordance with the techniques herein. Additionally, discussion is provided below regarding file servers and an embodiment in which the data nodes of the virtual or logical cluster are file servers. Subsequently, further details are provided regarding leveraging the remote replication techniques for the virtual or logically configured cluster LUN to stretch the virtual or logical cluster across multiple sites or storage systems.

A data storage system may provide support for one or more types of logical devices or LUNs. The techniques herein may be used in an embodiment having thin or virtually provisioned logical devices. A thin logical device or LUN is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device or LUN may be characterized as a regular logical device presented as having a particular storage capacity where physical storage is provisioned (allocated or bound) for the entire storage capacity when the thick device is configured.

In at least one embodiment in accordance with the techniques herein, a LUN can be accessed by a client, such as a host, by linking the LUN to a host accessible logical device sometimes referred to as a target logical device or volume. The foregoing relationship or connection between a LUN and a target logical device may be established using a command such as a link or bind command. In such an embodiment, the LUN may be linked (e.g., via execution of a bind or a link command) to a target logical device or LUN that is further exposed or made available to a file server, the host, or other data storage system client. In at least one embodiment, the target logical device or LUN may be a thin LUN (TLU). In such an embodiment, the relationship between a LUN and a linked target device may be broken using a command such as unbind or unlink. In following paragraphs, the techniques herein may use a LUN configured and provisioned as a TLU. However, more generally, any suitable LUN or logical device may be used. Furthermore, in connection with a linked target device such as a TLU, the target device may be further mounted as a file system by a file server as discussed in more detail elsewhere herein. In at least one embodiment, each file system may have its own corresponding block-based storage entity, such as a TLU, from which storage is provisioned. For a particular file system, its information including metadata and transaction log data may be stored on the corresponding TLU.

Figure 3:
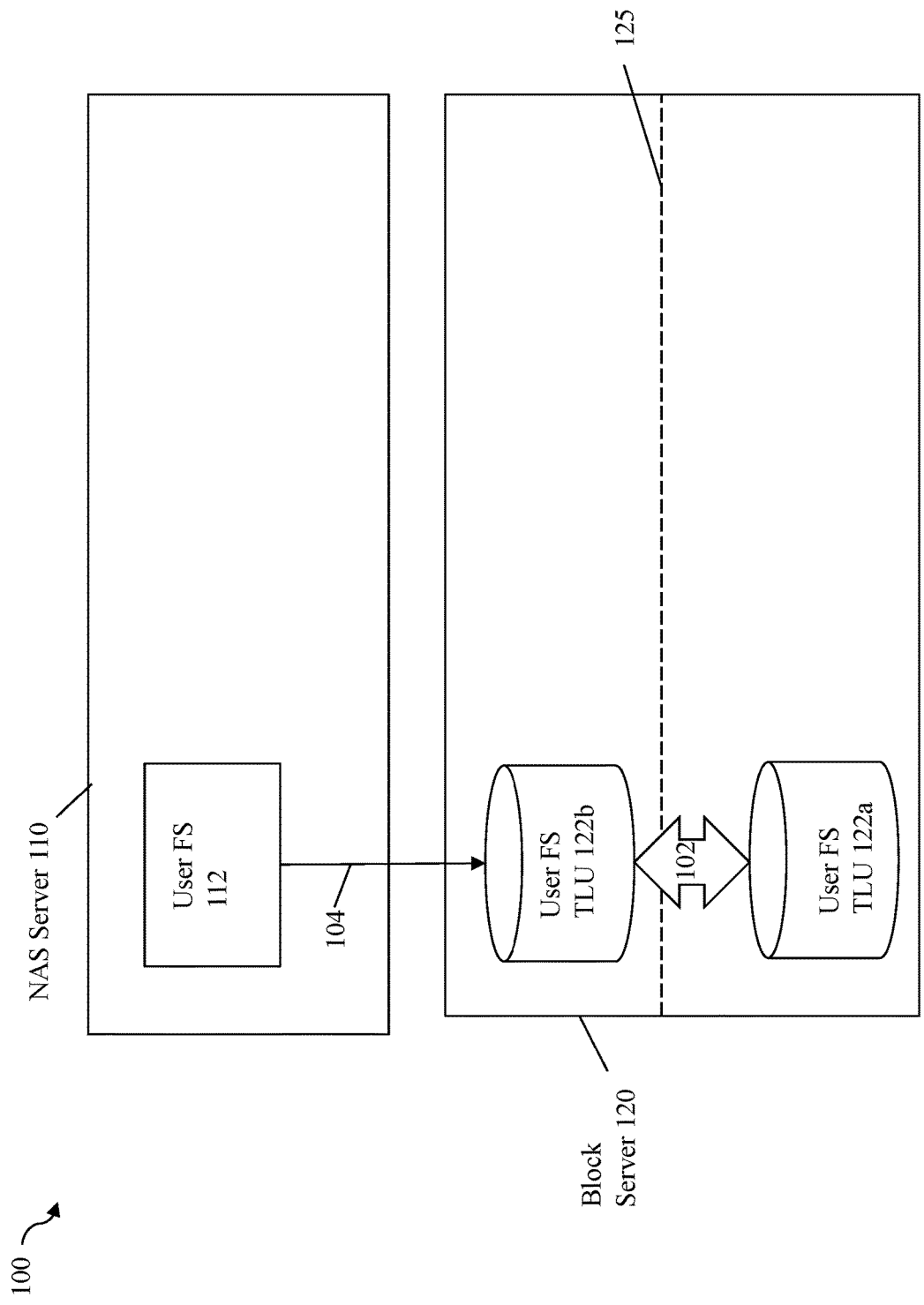
FIG. 3 is an example illustrating components that may be included in a data storage system providing block-based services and file-based services in an embodiment in accordance with the techniques herein.

Referring to FIG. 3, shown is an example of components that may be included a data storage system in an embodiment in accordance with the techniques herein. The example 100 includes the NAS (Network-attached storage) server 110 and the block server 120. The NAS server 110 is one example of a file-level computer data storage server that may be used with the techniques herein. More generally, an embodiment may be used in connection with any suitable file server. The block server 110 may be characterized as a block-based data storage server providing block level storage services. In at least one embodiment as further described in more detail below, the NAS server 110 may be implemented as software executing on a processor of a director (e.g, FA or other front end adapter) of the data storage system. In at least one embodiment as further described in more detail below, the block server 110 may also be implemented as software executing on a processor of a director where the director may be a hardware-based component. In at least one embodiment, the NAS server and/or block server may be software executing in an emulated version of a director, such as an FA. In this latter embodiment, the director such as the FA may be emulated or implemented as software executing on a processor rather than as a director that is a hardware-based component.

Consistent with other discussion herein, the NAS server 110 may receive file-based commands and I/O requests over a network from one or more clients, such as hosts having applications executing thereon. The NAS server 110 may include the user file system (FS) 112. The block server 120 may include block-based storage LUNs, such as thin LUNs (TLUs) providing the backing storage for file systems, such as user FS 112, of the NAS server 110. The line 125 within the block server 120 denotes a logical partitioning of storage objects or entities in the block server. The storage objects or entities in the block server 120 that are below the line 125 denote identities of the storage objects as used internally in the block server 120. Elements above the line 125 denote identities of the storage objects as exposed or exported from block server 120 to the NAS server 110, and thus to hosts or other clients of the NAS server 110. In this example 100, each storage object below the line 125 has a corresponding storage object above the line 125 whereby the storage object below line 125 may be exported or exposed externally for use by the NAS server 110 (and thus hosts or clients of the NAS server) as its corresponding storage object above the line 125. However, both the storage object below line 125 and its corresponding storage object above line 125 refer to the same storage entity on the block server 120 having an internal identity (e.g., below line 125) and a corresponding external, exposed or exported identity (e.g., above line 125). For example, the user FS TLU 122a may denote the TLU from which storage is provisioned for the user FS 112.

It should be noted that generally the block server 120 may have more storage entities below line 125 that are not exported or exposed and therefore do not have a corresponding identity above line 125. For example, as described in more detail herein, storage entities such as TLUs may be created within block server 120a and thus have a corresponding internal identity below line 125. However, not all such storage entities may be exposed or exported outside of the block server 120. For example, a TLU may be exposed or exported via a link command as a target device, such as a TLU. The target device TLU (e.g., that is linked to a block-based TLU) as exported by the block server 120 may then be further mounted by a host or client through the file server, such as NAS server 110. However, it may be that additional of TLUs or other LUNs are created within the block server 120 that may or may not be exposed or exported, such as via a link command, outside of the block server 120. Such TLUs or other LUNs not exposed or exported outside the block server 120 may not have a corresponding external identity above line 125.

The user FS TLU 122a may be exposed or exported 102 (e.g., such as by execution of the link command described herein) from the block server 120 to the NAS server 110 as the user FS TLU 122b. The NAS server 110 may mount the TLU 122b as the user FS 112. Clients, such as hosts, may issue file-based commands to the NAS server 110 where such commands are directed to the user FS 112. For example, the file-based commands issued to the NAS server 110 may include commands to write data to a file, create a file, create a directory, delete a file, delete a directory, read data from a file, delete specified portions of a file, and the like. The arrow 104 denotes that the user FS 112 is created and has its storage provisioned from the user FS TLU 122b of the block server 120. The arrow 104 denotes that the FS TLU 122b is mounted as a file system, user FS 112 (which is R/W). Subsequent to mounting user FS 112, the file system user FS 112 may be exported and made available to a host or other client (having the correct authentication) through the NAS server 110.

In connection with user FS 112 as well as more generally other file systems, the file system may have associated file system data, file system metadata and a file system transaction log. The file system data may include the user data such as written by clients and stored in files of the file system. The file system metadata may generally include metadata or information about the file system. The file system transaction log or journal is a log in which writes or modifications made to the file system are recorded. The file system may utilize the concept of a transaction that may include multiple subtransactions or writes. Thus, a single transaction may include performing multiple writes to one or more storage objects of the file system.

To maintain write consistency and transaction level atomicity, when a first data node takes over for a failed data node, processing performed may include replaying the log for the file system exposed through and being serviced by the failed data node. The replaying of the log for a file system may includes checking for, and completion of, any pending subtransactions (as denoted by steps of a transaction recorded in a log but which have not yet been completed as denoted in the log). Such pending subtransactions are completed and applied to the file system prior to the first data node continuing servicing subsequent I/Os and requests for the file system on behalf of the failed data node. Such replaying of the file system log may be performed and applied to the file system to ensure that the file system is in a write consistent state prior to subsequently mounting the file system exposed to hosts or other clients now through the first node, and prior to servicing subsequent I/O request directed to the file system through the first node.

In at least one embodiment described in more detail below, the NAS server 110, more generally also referred to herein as a file server, may store information on a cluster LUN. The information stored on the cluster LUN may include, for example, one or more logs for corresponding file systems serviced or exposed through the file server 110, as well as other data and metadata related to the file systems and file server 110 itself. This is described in more detail below in connection with other figures.

What will now be described in more detail is remote replication, such as block-based remote replication. With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® or VMAX® data storage systems. The RA may be used with the Symmetrix® Remote Data Facility (SRDF®) products provided by Dell EMC Corporation. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) or a remote replication facility for use in an embodiment in connection with techniques herein.

Figure 4:
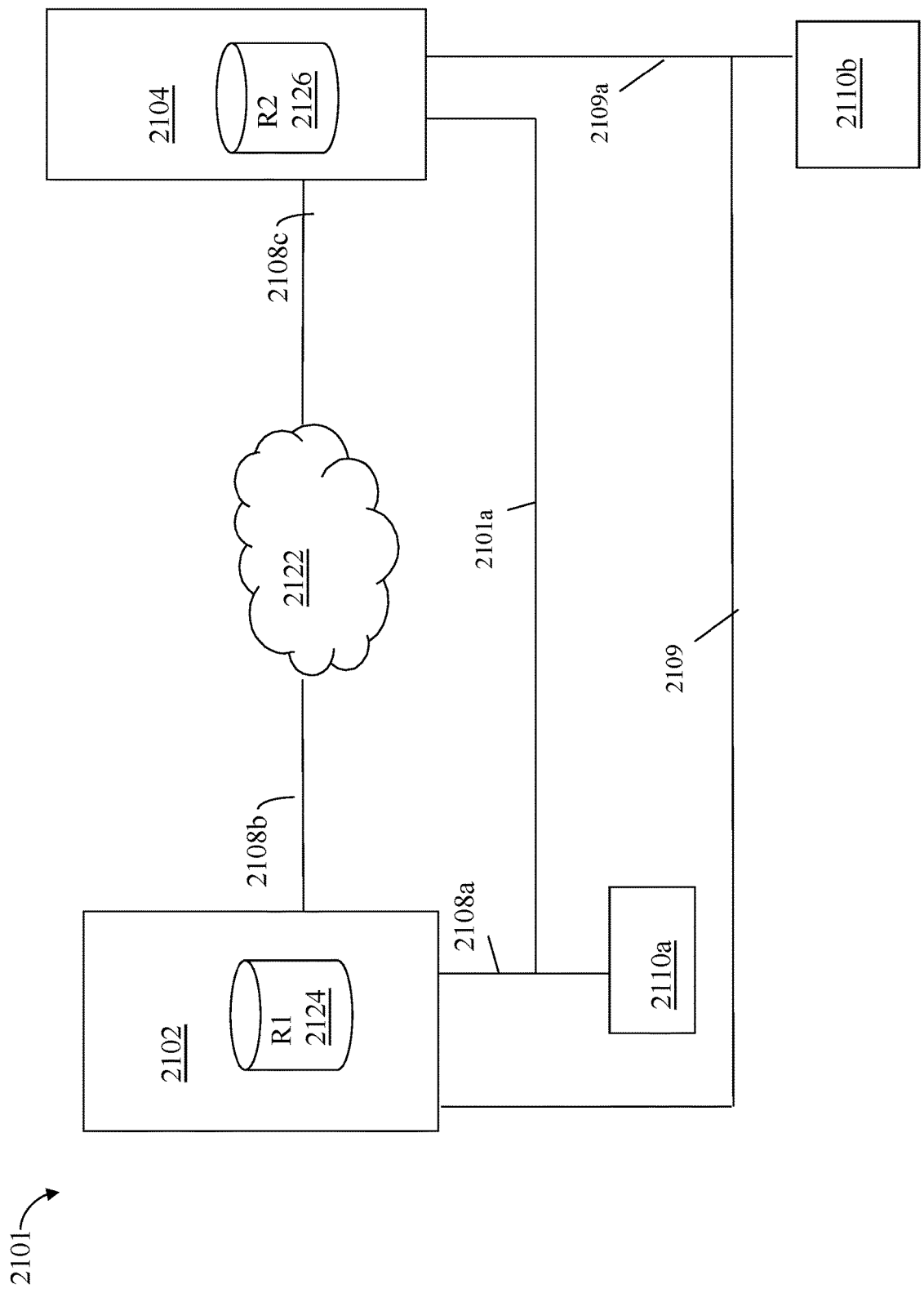
FIGS. 4, 5 and 6 are examples illustrating remote replication that may be used in an embodiment in accordance with the techniques herein.

Referring to FIG. 4, shown is an example of an embodiment of a system 2101 that may be used in connection with the techniques described herein. It should be noted that the embodiment illustrated in FIG. 4 presents a simplified view of some of the components illustrated in FIG. 1, for example, including only some detail of the data storage systems 12 for the sake of illustration.

Included in the system 2101 are data storage systems 2102 and 2104, and hosts 2110a and 2110b. The data storage systems 2102, 2104 may be remotely connected and communicate over network 2122 (e.g., storage area network (SAN)). In at least one embodiment, the systems 2102, 2104 may communicate over 2108b, 2122, 2108c which may represent one or more FC connections over which communications may be transmitted in accordance with the FC protocol. Host 2110a may send I/O operations, more generally communications or requests, to data storage systems 2102 and 2104, respectively, over connections 2108a and 2101a. Host 2110b may send I/O operations, or more generally communications or requests, to data storage systems 2102 and 2104, respectively, over connections 2109 and 2109a. Connections 2108a, 2101a, 2109 and 2109a may be, for example, a network or other type of communication connection. The data storage system 2102 may be characterized as local with respect to host 2110a and the data storage system 2104 may be characterized as remote with respect to host 2110a. The data storage system 2104 may be characterized as local with respect to host 2110b, and the data storage system 2102 may be characterized as remote with respect to host 2110b.

The data storage systems 2102 and 2104 may include one or more data storage devices and other resources. In this example, data storage system 2102 includes logical storage device R1 2124 and data storage system 2104 includes logical storage device R2 2126. Both of the data storage systems may include one or more other logical and/or physical devices. From viewpoint of hosts 2110a and 2110b, R1 2124 and R2 2126 may be logically configured as the same logical device, such as the same LUN A, whereby R1 2124 and R2 2126 may be maintained as logical mirrors of one another as described in more detail below in connection with automated replication.

The host 1210a may issue a command, such as to write data to device R1 of data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by Dell EMC Corporation. Data storage device communication between Symmetrix® data storage systems using SRDF® is described, for example, in U.S. Pat. Nos. 5,742,792, 5,544, 347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the R1 2124 and R2 2126 storage devices. In this example, the host 2110a interacts directly with the device R1 of data storage system 2102, but any data changes made are automatically provided to the R2 device of data storage system 2104 using SRDF®. In operation, the host 2110a may read and write data using the R1 volume in 2102, and SRDF® may handle the automatic copying and updating of data from R1 to R2 in data storage system 2104. In a similar manner, writes from host 2110b over connection 2109 to R1 2124 may also automatically be replicated to R2 2126.

As illustrated in connection with other figures herein, data storage system 2102 may have one or more RAs included therein to facilitate remote connections to the data storage system 2104. Communications between storage system 2102 and 2104 may be made over connections 2108b, 2108c to network 2122. Data storage system 2104 may include one or more RAs for use in receiving the communications from the data storage system 2102. The SRDF® replication functionality may be facilitated with the RAs provided at each of the data storage systems 2102 and 2104. In connection with SRDF®, a single RDF link or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 2102, have corresponding target devices of a target group, such as devices on data storage system 2104. Devices in a source group may be mirrored in corresponding devices of a target group using SRDF® functionality.

SRDF®, or more generally any remote replication data facility, may operate in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode for example, the first or source storage system 2102 will not provide an indication to the host 2102 that the data write operation is complete until the first storage system 2102 receives an acknowledgement from the second data storage system 2104 regarding the write data for the R2 device. In at least one embodiment, the second system 2104 may return an acknowledgement to the system 2102 regarding successful completion or replication of the write data once the system 2104 stores the write data in its system-local cache. At a later point in time, the write data may be destaged from the cache of the system 2102 to the physical storage provisioned for the R2 device 2126. In contrast, in connection with the asynchronous mode, the host receives an acknowledgement from the first data storage system as soon as the information is committed to the first data storage system, without waiting for an acknowledgement from the second data storage system. In at least one embodiment with asynchronous mode, the acknowledgement may be returned from the system 2102 to the host 2110a regarding completion of the write operation once the system 2102 stores the write operation write data in its system local cache. Subsequently, the system 2102 may destage the write data from its local cache to the physical storage provisioned for the R1 device 2124.

Described in following paragraphs are techniques that may be used in connection with performing data replication in a synchronous manner such as SRDF® operating in an synchronous mode (SRDF®/S). With synchronous mode data replication, a host 2110a may issue a write to the R1 device 2124. The primary or R1 data storage system 2102 may store the write data in its cache at a cache location and mark the cache location as including write pending (WP) data. The remote data replication facility operating in synchronous mode, such as SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 5:
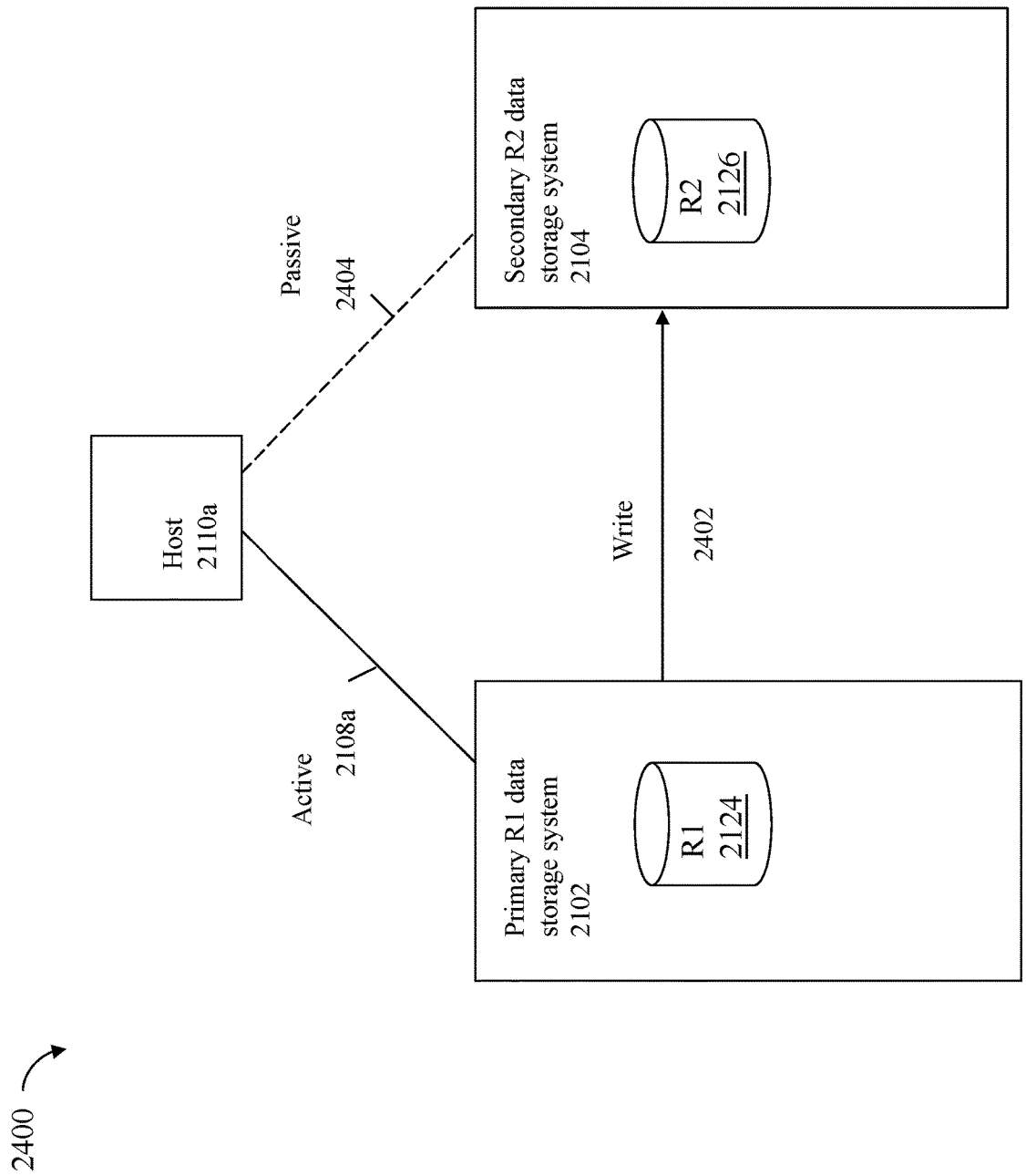

With reference to FIG. 5, shown is a further simplified illustration of components as described in connection with FIG. 4. It should be noted that element 2402 generally represents the replication link used in connection with sending write data from the primary R1 data storage system 2102 to the secondary R2 data storage system 2104. It should be noted that link 2402, more generally, may also be used in connection with other information and communications exchanged between 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 5 may also be referred to herein as an active-passive configuration used with synchronous replication where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The active-passive configuration of FIG. 5 may be further modified to an active-active configuration in connection with synchronous replication described below in connection with FIG. 6. Such an active-active configuration in connection with synchronous replication as illustrated in FIG. 6 may be used in accordance with techniques herein.

Figure 6:
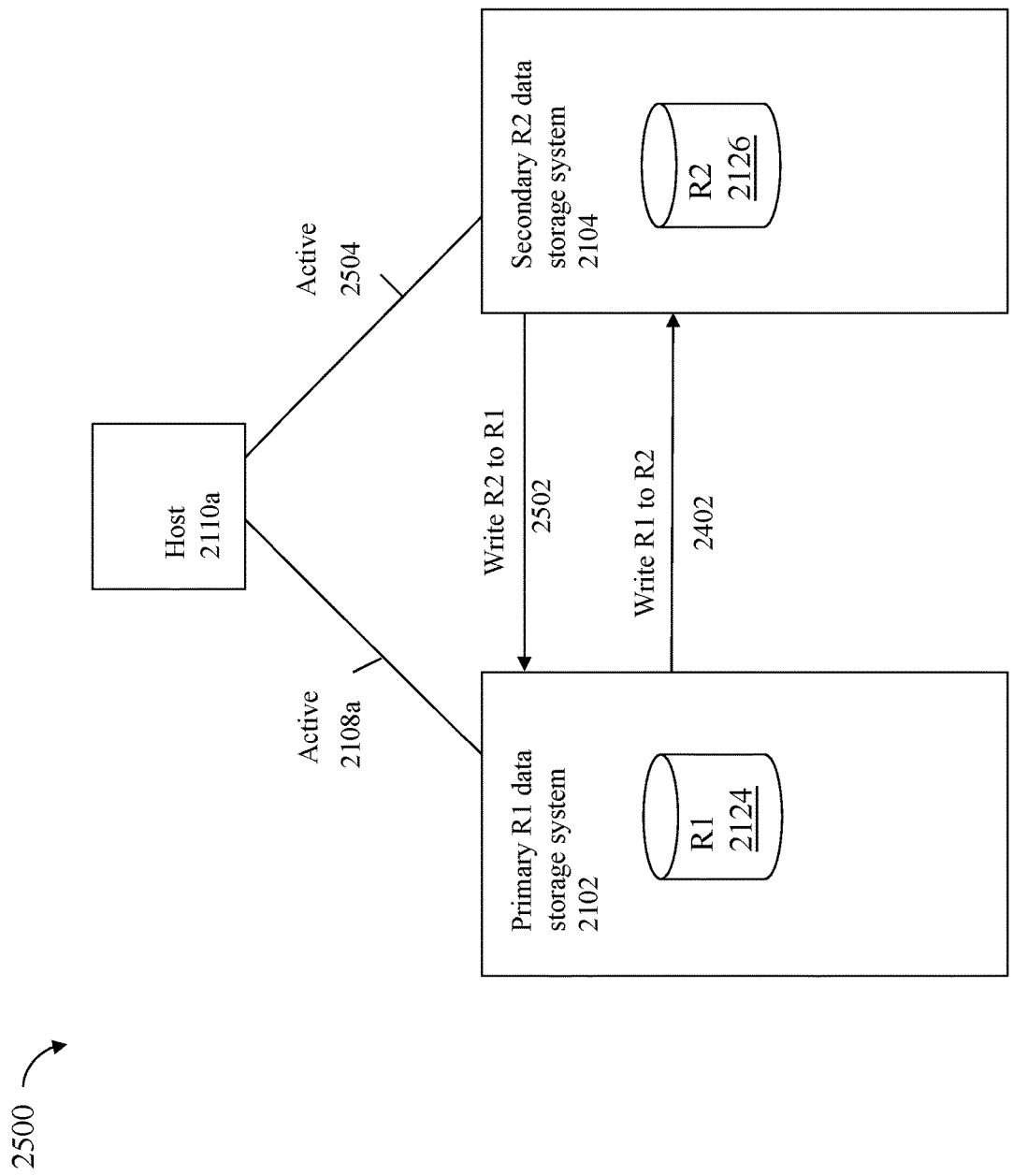

Referring to FIG. 6, shown is an example configuration of components that may be used in an embodiment in accordance with techniques herein. The example 2500 illustrates an active-active configuration in connection with synchronous replication. In an active-active configuration with synchronous replication, the host 2110a may have a first active path 2108a to the R1 data storage system and R1 device 2124 configured as LUN A. Additionally, the host 2110a may have a second active path 2504 to the R2 data storage system and R2 device 2126 configured as the same LUN A. From the view of the host 2110a, paths 2108a and 2504 appear as 2 paths to the same LUN A as described in connection with FIG. 5 with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is destaged from the cache of the R1 system 2102 to physical storage (e.g., non-volatile backend storage) provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. The R2 system 2104 then returns an acknowledgement to host 2110a over path 2504 that the second write has completed.

Effectively, the active-active configuration used with synchronous replication as in FIG. 6 has the R2 system 2104 act as another primary data storage system which facilitates propagation of writes received at the data storage system 2104 to the data storage system 2102. It should be noted that although FIG. 6 illustrates for simplicity a single host accessing both the R1 device 2124 and R2 device 2126, any number of hosts may access one or both of the R1 device 2124 and the R2 device 2126.

Also, although only a single R1-R2 pair configured as LUN A has been described, more generally, multiple LUNs may be configured whereby each such LUN is configured as a different R1-R2 pair, respectively, on data storage systems 2102 and 2104.

In at least one embodiment in accordance with the techniques herein as will be described in more detail below, the virtual or logically configured cluster LUN may be implemented using a first cluster LUN of a first system, such as 2102 and a second cluster LUN of a second system, such as 2104, where the first and second cluster LUNs are configured as the same logical device or LUN. The first and second cluster LUNs may be configured for bidirectional remote replication as illustrated in FIG. 6. In at least one embodiment, the remote replication mode may be synchronous.

Consistent with discussion above in connection with FIGS. 4, 5 and 6, the R1 2124 and R2 2126 RDF device pair may be configured as the same LUN or logical device as noted above. Both the R1 and R2 devices of the pair may be configured as the same LUN such that both the R1 and R2 devices have the same external identity and appear as a single virtual or logically configured LUN across multiple data storage systems or sites 2102, 2104. In at least one embodiment, the R1 and R2 devices having the same external identity or configured as the same virtual LUN may be mean that the R1 and R2 devices each have the same properties or attributes such as, for example, the same device identifier, such as the same device WWN (world wide name), the same geometry, and so on. Generally, both the R1 and R2 devices are accessible for reading and writing and the RDF may provide for ensuring that each of the R1 and R2 devices contains a current and consistent copy of the data.

In at least one embodiment, the the R1-R2 device pair configured as the same LUN for bidirectional remote replication by a RDF may be implemented using SRDF/Metro® by Dell EMC Corporation.

In at least one embodiment, the data storage systems may support embedded file services such that the data storage systems provide both file-based services and block-based services. In at least one embodiment, the data storage systems may provide support to host a virtualized environment in which applications may execute in the context of virtual machines (VMs) on processors of the data storage system. The data storage system may include a hypervisor environment that can host guest operating systems running as VMs on processors of the system. For example, in at least one embodiment, VMs may execute on directors of the data storage system, such as processors of HAs or FAs of the data storage system.

Embedded network attached storage (eNAS) may use the hypervisor environment provided in the data storage system as noted above to create and run a set of VMs with applications, or more generally software components, executing in the context of the VMs running on processors of the data storage system. In at least one embodiment, the applications or software components executing in the context of VMs on the processors of the data storage system may include file servers. Consistent with discussion herein, the file servers hosted on the VMs may access data from the backend storage of the data storage system and provide host or client access. The file servers may support one or more file system protocols, such as NFS (Network File System), CIFS, (Common Internet File System), pNFS (Parallel NFS), and the like. The file servers may provide access to one or more file systems, such as described in connection with FIG. 3 with the difference that the file server executes in the context of a VM.

In following paragraphs and figures consistent with other discussion herein, a data node refers to a processor, such as of a director, in the data storage system. In at least one embodiment, an application or software component executing on the context of a VM may execute on such a processor of the data storage system. In at least one embodiment, the application or software executing on each data node may be a file server, such as the NAS server 110 described in connection with FIG. 3. In this manner, each data node in at least one embodiment may perform processing and function as a file server, such as the NAS server 110, described in connection with FIG. 3. Thus, in following paragraphs and examples, a data node is referred to as a file server based on the processing and functions performed by the file server software as the particular software executing on the data node in the context of a VM on a processor of the data node.

As noted above, in at least one embodiment of the techniques herein, a data storage system may provide an environment in which a software defined network attached storage (SDNAS) solution may be utilized. In such an embodiment, multiple directors may include processors upon which VMs execute. File servers may execute in the context of the VMs. The file servers may also be referred to more generally as data nodes. In at least one embodiment, there may be one file server executing in the context of VM per director. Thus, a single data node may denote a single file server instance.

SDNAS may be deployed as a cluster, with one cluster corresponding to one data storage system. Generally, a cluster may be defined as a set of components, such as data nodes, that can be logically viewed as a single system or included in a single system. The SDNAS hosted on a data storage system may consume physical storage from the backend non-volatile storage devices exposed as data stores or file systems through the data nodes or file servers. SDNAS has intra site HA and can support failover of NAS Servers within a cluster, such as within a single instance of data storage system. In at least one embodiment, the HA mechanism of SDNAS uses a cluster LUN exposed to all file servers or data nodes on the single data storage system to maintain a heartbeat or storage quorum. The HA mechanism of SDNAS also confirms quorum health via internal networking to determine availability of all file servers or data nodes within a single data storage system or cluster. The HA solution which can failover data nodes or file servers is robust, has very limited orchestration needs, is internal to the solution, and provides a well defined RTO for intra site failovers. A special, existing internal service also acts as a failure detection mechanism and fails over file servers from a failed data node to a healthy data node within the cluster or within the site.

In at least one embodiment, the techniques herein leverage the foregoing intra site or intra cluster HA solution provided by SDNAS and extends this to two geographically separated or distinct data storage systems. Thus, in such an embodiment, the cluster may be characterized as a virtual cluster that is logically viewed to include the two distinct sites or data storage systems. The techniques herein provide a HA solution spanning both sites or data storage systems superior to existing remote replication and failover solutions. An embodiment in accordance with the techniques herein that extends the local intra site HA of a single data storage system to multiple data storage systems resolves the problems or drawbacks noted above. The foregoing and other aspects of the techniques herein are described in more detail below.

Figure 7:
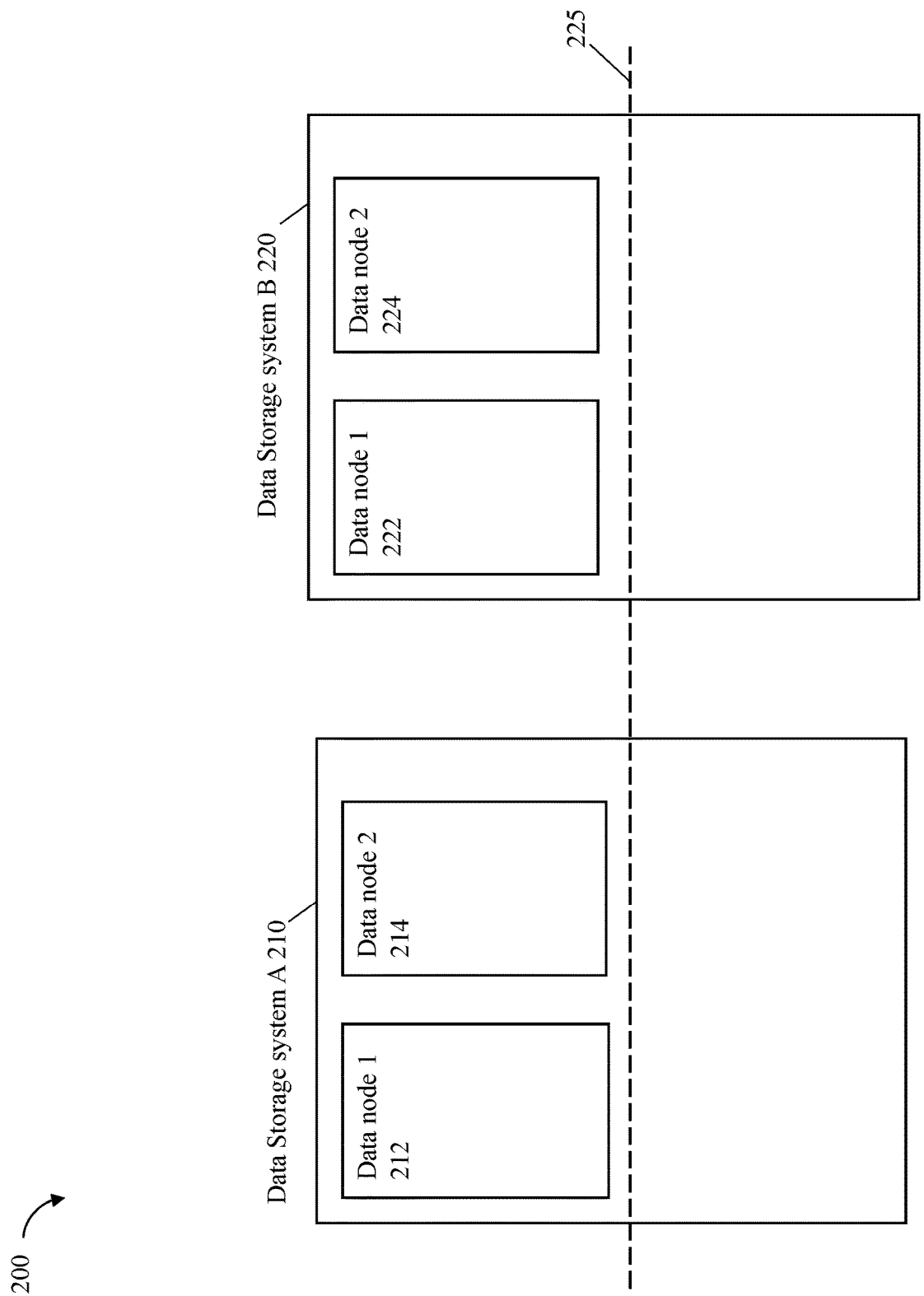
FIGS. 7, 8, 9, 10, 11, 12 and 13 are examples illustrating configurations and steps performed to establish a high availability virtual cluster spanning multiple data storage systems in accordance with the techniques herein.

Referring to FIG. 7, shown is an initial configuration 200 including two data storage systems A and B, 210, 220. The systems A 210 and B 220 may be remotely located each at a different site so that systems A and B are geographically and physically separated. Each of the systems A and B includes 2 data nodes. As discussed above, each data node may be a file server executing in the context of a VM hosted on a processor such as a director of the data storage system. FIG. 7 may denote the state of the systems A 210 and B 220 at a first point in time.

In connection with FIG. 7 and others herein, line 225 may denote a logical partitioning of storage objects or entities in the data storage system. The storage objects or entities below line 225 may denote those in the block server and are block based storage entities. Elements above the line 225 denote other the storage objects and entities such as data nodes functioning as file servers.

Figure 8:
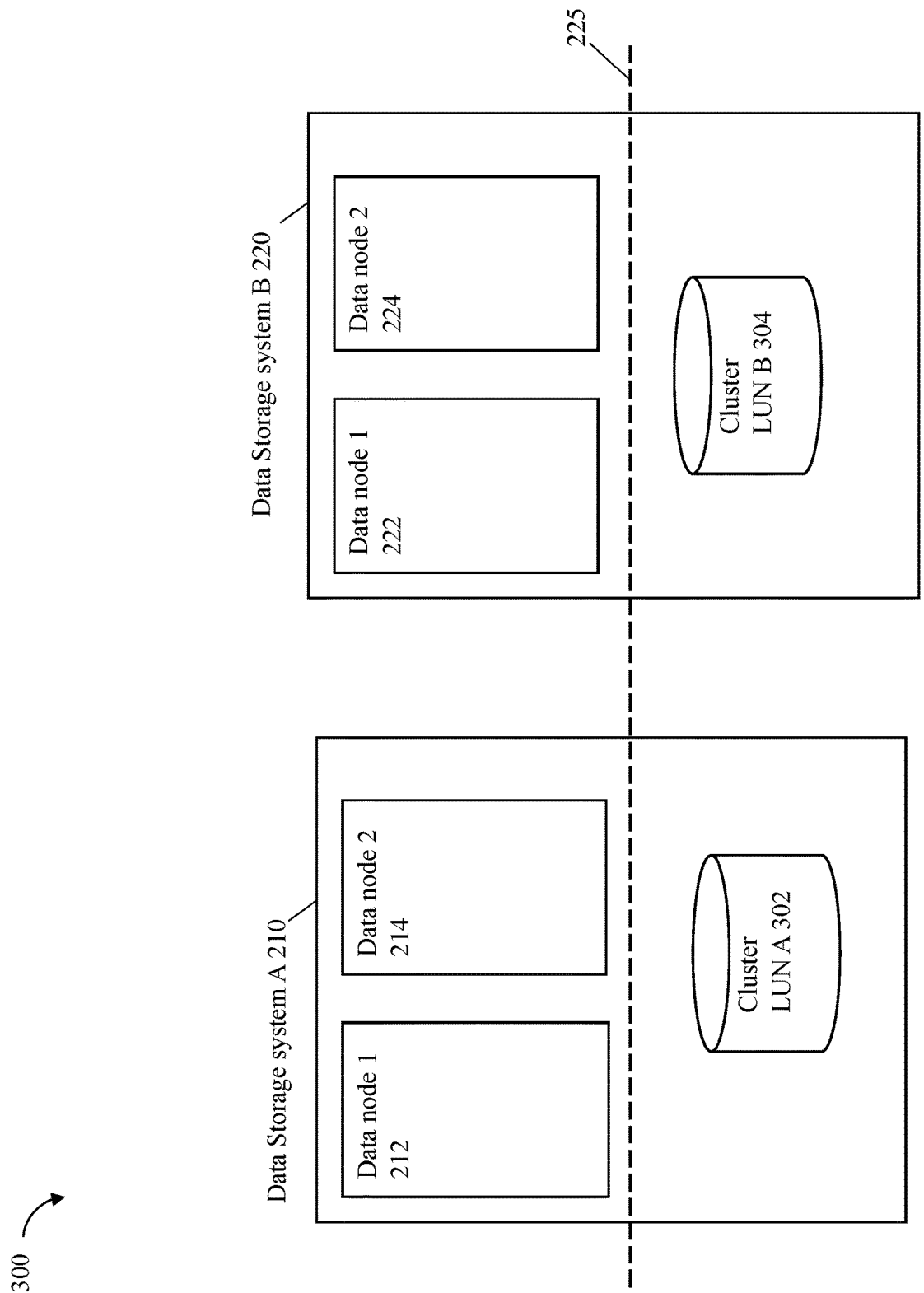

Referring to FIG. 8, at a second point time subsequent to establishing the configuration of FIG. 7, cluster LUNs 302 and 304 may be created on each of the data storage systems A and B. In particular, FIG. 8 illustrates that cluster LUN A 302 may be configured on data storage system A 210 and cluster LUN B 304 may be configured on data storage system B 220. Cluster LUN A 302 may generally include information used for intra-node failover on data storage system A 210. Cluster LUN B 304 may generally include information used for intra-node failover on the data storage system B 220. For example, each of the cluster LUNs A and B may include information used by a data node taking over for another failed node in order to continue providing services or processing in place of the failed node.

Figure 9:
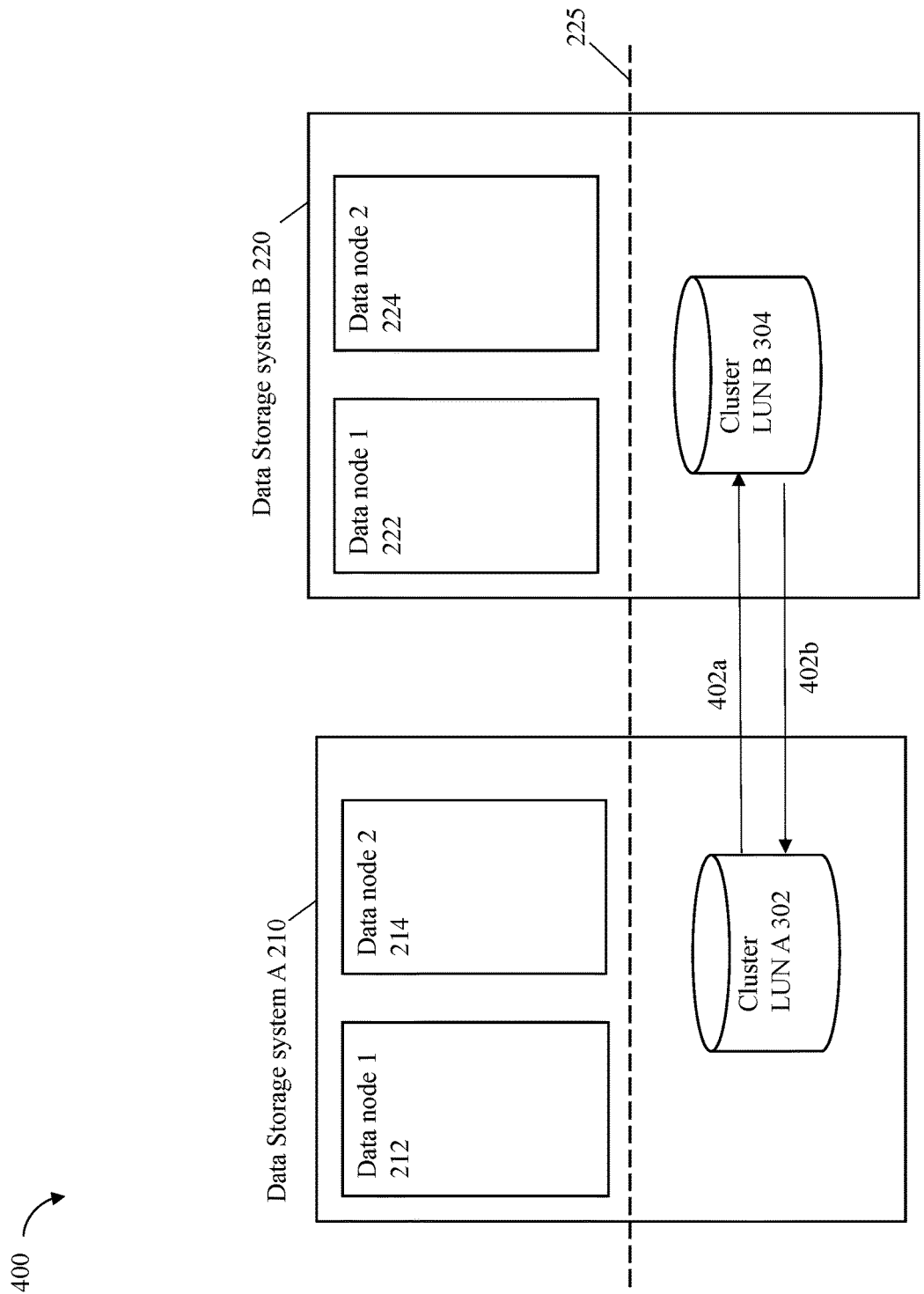

Referring to FIG. 9, at a third point time subsequent to the configuration of FIG. 8, remote bidirectional replication may be established between the cluster LUNs A 302 and B 304, respectively, on the systems A and B. In particular, the remote replication provides for maintaining both cluster LUNs A and B as mirrored synchronous copies such as described above in connection with FIG. 6. Further, as also discussed above, both cluster LUNs A and B may have the same external identity so that, both cluster LUNs A and B appear and are exposed as the same logical device or LUN. In at least one embodiment, the replication facility may be the Symmetrix Remote Data Facility (SRDF®) by Dell EMC®. In particular, the cluster LUNs A and B may be configured for remote replication using SRDF/Metro® by Dell EMC®. With SRDF®, the cluster LUNs A and B are configured as an R1-R2 pair where, for example, cluster LUN A may be the R1 or primary device and cluster LUN B may be the R2 or secondary device. Cluster LUN A 302 may be read and write accessible to data nodes 212, 214 of the system 210. Cluster LUN B 304 may be read and write accessible to data nodes 222, 224 of the system 220.

The secondary or R2 device, cluster LUN B, may take on the same device identify as the R1 or primary device, cluster LUN A (e.g., have the same geometry, device world wide name (WWN) and other device attributes). Thus the cluster LUNs A and B both have the same external identity and may then appear as a single logical device, or the same logical device, across the two data storage systems A and B for presentation to a single host or host cluster or other external component. Additionally, in connection with the techniques herein, the cluster LUNs A and B collectively also appear as the same logical device or LUN to the data nodes 212, 214, 222 and 224.

In at least one embodiment, writes to cluster LUN A 302 by data nodes 212, 214 are automatically replicated or mirrored on the cluster LUN B 304. Writes to cluster LUN B 304 by data nodes 222, 224 are automatically replicated or mirrored on the cluster LUN A 302. In this manner, both cluster LUNs A and B 302, 304 are maintained as mirrored copies of one another. Data nodes 212, 214 accessing cluster LUN A 302 may read replicated or mirrored data written by data nodes 222, 224 to cluster LUN B 304. Data nodes 222, 224 accessing cluster LUN B 304 may read replicated or mirrored data written by data nodes 212, 214 to cluster LUN A 302. In such an embodiment, the bidirectional remote replication performed by a RDF, such as SRDF/Metro®, may be used to ensure that each copy on LUNs 302, 304 remains current, consistent, and addressing any write conflicts which may occur between the paired devices. In such an embodiment, any writes or modifications to cluster LUN A may be replicated or mirrored on cluster LUN B, and any writes or modifications to cluster LUN B may be replicated or mirrored on cluster LUN A.

Figure 10:
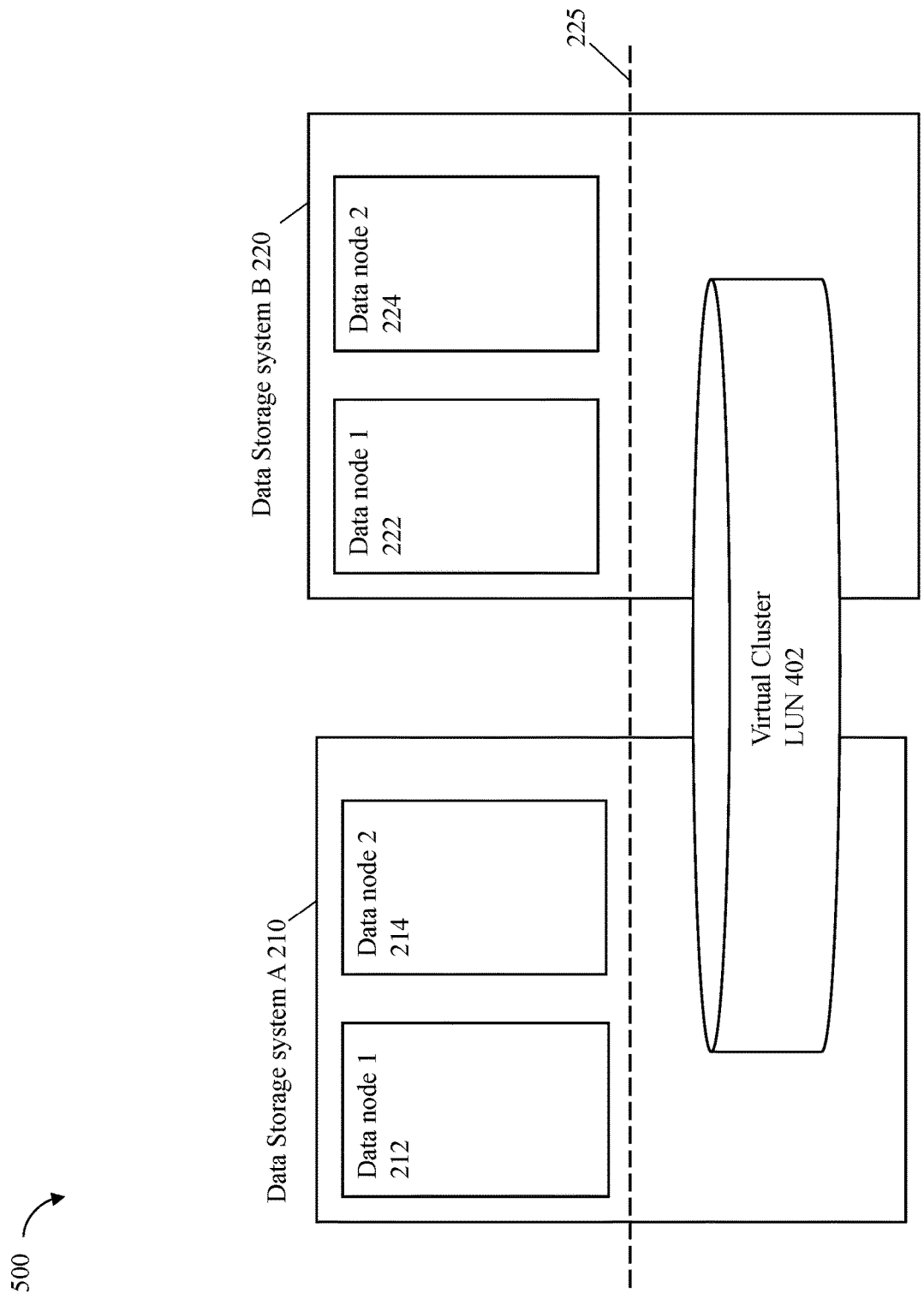

Referring to FIG. 10, at a fourth point time subsequent to the configuration of FIG. 9, after establishing cluster LUNs A and B as a device R1-R2 pair for remote replication as discussed above, a cluster manager, such as an SDNAS cluster manager component may view cluster LUNs A and B as a single virtual cluster LUN 402 spanning the 2 data storage systems or sites.

Figure 11:
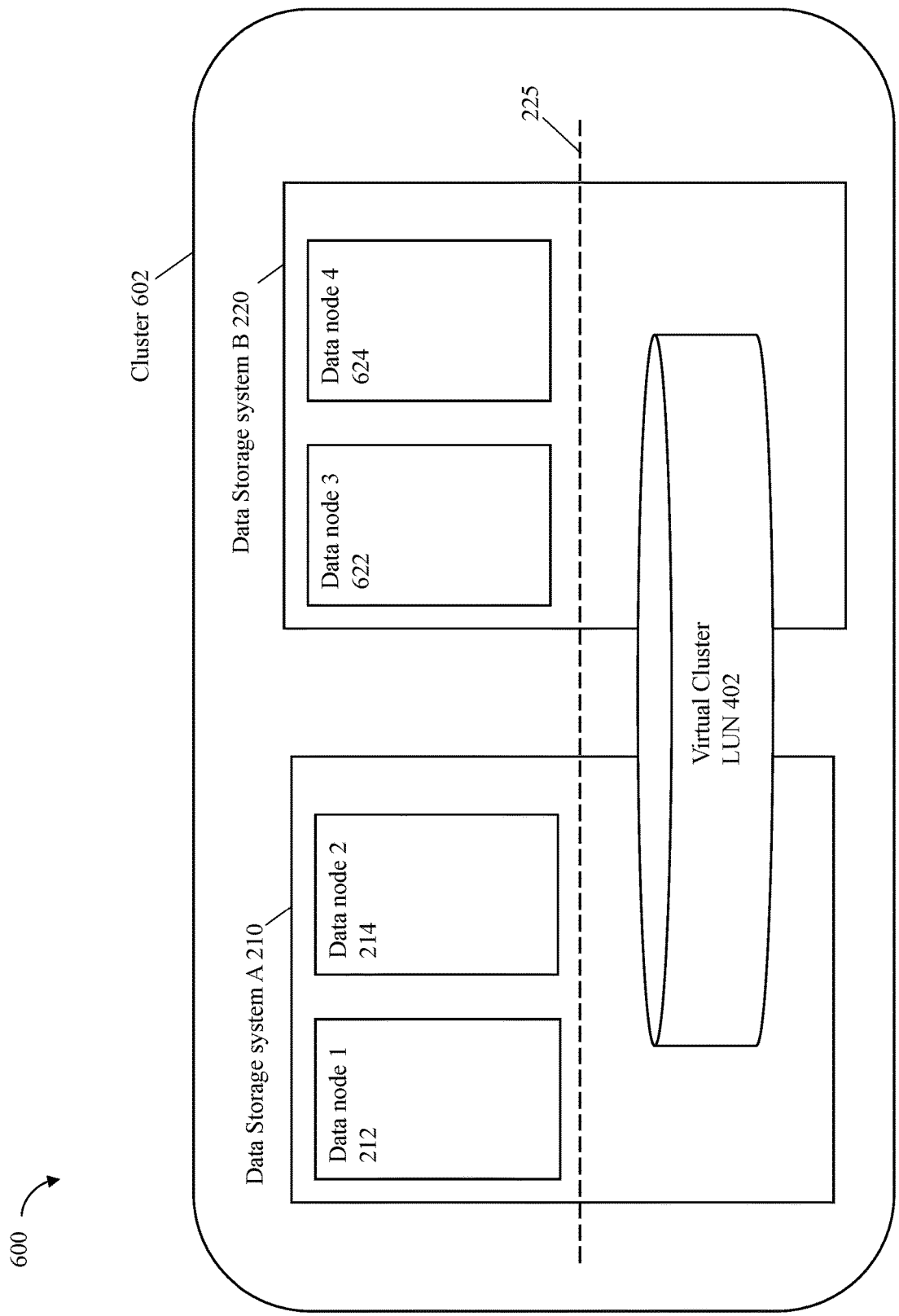

Furthermore, as illustrated in FIG. 11, the data storage systems A and B are logically viewed by the SDNAS cluster manager as a stretched cluster or a single virtual cluster 602, rather than 2 clusters. Still further, as illustrated in FIG. 11, the data nodes of both storage systems A and B are logically viewed by the cluster manager as included in the same cluster 602 even though the underlying components are physically included in two different sites or data storage systems. For example, data nodes 212, 214 of the system 210 and data nodes 622 and 624 of the system 220 may be logically viewed as included in the same virtual cluster 602.

Figure 12:
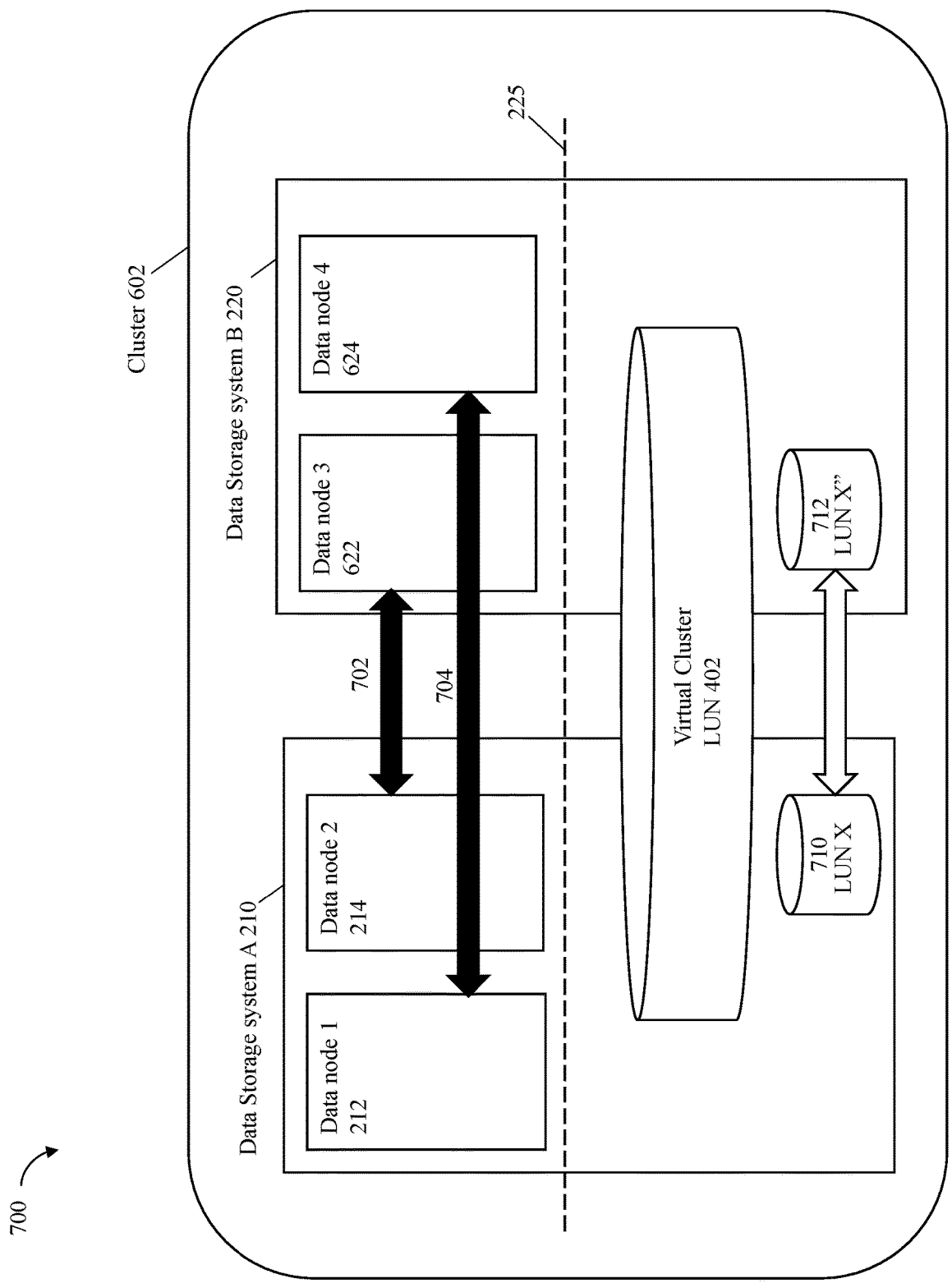

With reference now to FIG. 12, pairs of primary and backup data nodes may be selected across the logically viewed single cluster where data nodes of a single pair may actually be located in different data storage systems to provide HA across data storage systems or sites. For example, as illustrated in FIG. 12, the data nodes 212, 214 are included in data storage system A and the data nodes 622 and 624 are included in the data storage system B. However, as discussed above, all 4 data nodes appear to logically be included in the same cluster 602, such as to a cluster manager.

In at least one embodiment, for each pair of data nodes, the first data node of the pair may be physically located in the data storage system A and the second data node of the pair node may be physically located in the data storage system B. For example, with reference to FIG. 12, data nodes 1 and 4 (212,624) may be identified (704) as a first pair where data node 1 is the backup or failover data node for data node 4, and where data node 4 is the backup or failover data node for data node 1. Upon the failure of data node 1, data node 4 resumes or takes over the processing for the failed data node 1. Upon the failure of data node 4, data node 1 resumes or takes over the processing for the failed data node 4. For example, with reference to FIG. 12, data nodes 2 and 3 (214, 622) may be identified (704) as a second pair where data node 2 is the backup or failover data node for data node 3, and where data node 3 is the backup or failover data node for data node 2. Upon the failure of data node 2, data node 3 resumes or takes over the processing for the failed data node 2. Upon the failure of data node 3, data node 2 resumes or takes over the processing for the failed data node 3.

Each pair 702, 704 of data nodes noted above provides HA which, from the cluster manager view point or exposure, is local or intra-site due to the logical presentation to the cluster manager of both data storage systems as a single cluster deployment.

As discussed above, the techniques herein provide for presenting a single virtual cluster LUN 402 to the cluster manager due to the cluster LUNs A and B configured as mirrored LUNs having bidrectional remote replication and having the same identity. The two data storage systems A and B logically appear to the cluster manager as a single virtual cluster 602. Although not explicitly illustrated in the FIGS. 7-11, any file systems on data storage system A that are created and exposed through the data nodes as file servers of system A (e.g., such as described in connection with FIG. 3) may also be configured for remote replication on system B. For example, with reference to FIG. 12, a file system may be configured to have its storage provisioned from LUN X 710 on the system A. The LUN X 710 on data storage system A may be configured for bidirectional remote replication as LUN X" 712 on the data storage system B in a manner similar to that as noted above for the cluster LUNs A and B. The two LUNs X and X", respectively, on the systems A and B may be configured as the same logical device. For example, the LUN X 710 on data storage system A and the LUN X" 712 on data storage system B may be configured as an R1-R2 pair for bidirectional remote replication using SRDF/Metro® by Dell EMC® (e.g., as described above such as in connection with FIG. 6).

In such an embodiment in accordance with the techniques as described above, when a director hosting a data node or file server fails, its paired backup data node on a remote site takes over. All data used by the backup data node or file server on the remote site is already present on the remote site due to the backend mirroring of the cluster LUN and also all file system data via SRDF/Metro®. In at least one embodiment, the failure detection of a failed file server or data node may be handled by the cluster manager component that believes that the backup data node on remote site is part of same cluster due to mirroring of the cluster LUNs.

The techniques described herein logically present a single virtual cluster 602 of data nodes 212, 214, 622 and 624. The single virtual cluster 602 is logically viewed as including both the data storage systems A and B. For each pair of data nodes including a first data node in system A and a second data node in system B, when the first data node in the system A fails, the backup node, the second data node on the remote site B, is presented and viewed, such as by the cluster manager, as being in the same single virtual cluster 602 as the failed first data node. This is achieved by mirroring the cluster LUNs A and B using SRDF/Metro® by Dell EMC®. Each R1-R2 logical device pair configured for remote replication using SRDF/Metro® enables the same LUN identity and properties on both the sites or systems A and B. Thus, the cluster LUNs A and B (302 and 304 respectively) are configured as an R1-R2 logical device pair for remote replication and are exposed and presented externally and to the data nodes 212, 214, 622 and 624 as the same virtual cluster LUN 402. In a similar manner, each pair of data or file system LUNs configured as an R1-R2 logical device pair for remote replication is exposed and presented externally as the same LUN externally and to the data nodes 212, 214, 622 and 624. In this manner, a virtual single cluster 602 is presented across data storage systems or sites A and B and logically extends the local HA across the multiple data storage systems or sites.

As a consequence of configuring and establishing 2 cluster LUNs 302, 304 as an R1-R2 replication pair with bidirectional replication (e.g., from data storage system A to B, and from data storage system B to A), the 2 cluster LUNs 302, 304 configured as the same LUN or logical device may be viewed as the single cluster LUN 402 among all data nodes of the systems A and B. The cluster LUN 402 allows each data node of the systems 210, 220 to have access to information about all other data nodes of the systems 210, 220. Thus, from the view of the data nodes based on accessibility to the virtual cluster LUN 402, the virtual cluster includes all 4 data nodes 212, 214, 622 and 624. In this manner, the data nodes included in the virtual cluster include those data nodes that can read and write to the virtual cluster LUN 402

Figure 13:
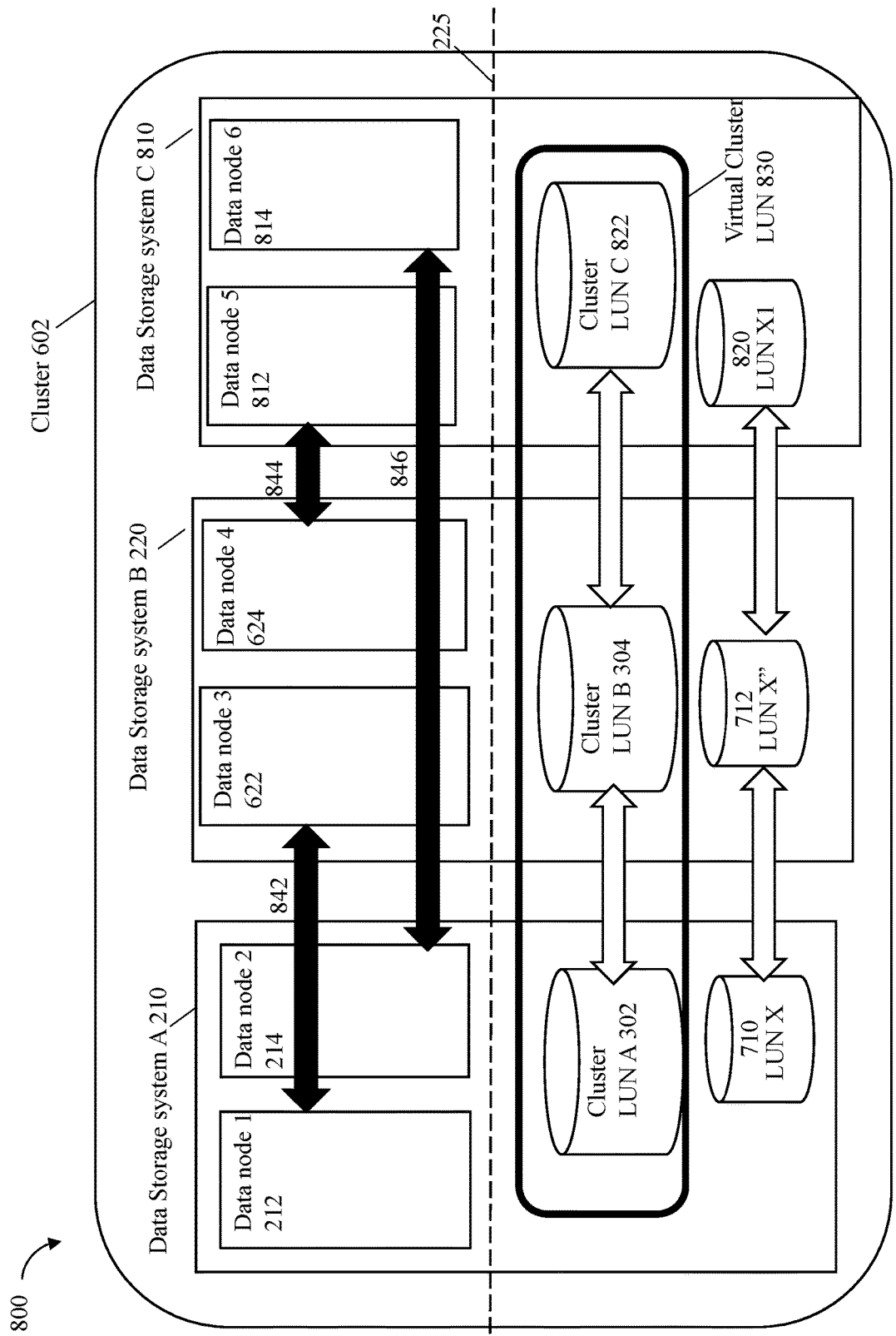

The techniques herein have been described above in connection with an embodiment in which the virtual cluster spans two data storage systems. More generally, the techniques herein may be used in connection with more than two data storage systems whereby the virtual cluster spans more than two data storage systems. For example, with reference to FIG. 13, shown is an example of an embodiment of the techniques herein where the virtual cluster spans 3 data storage systems.

The example 800 includes data storage systems 210, 220 and 810. The systems 210 and 220 and components thereof are as described above. Additionally, FIG. 13 includes a third data storage system, data storage system C 810 that includes data nodes 812, 814, cluster LUN C 822 and LUN X1 820. Cluster LUN B 304 and cluster LUN C 822 may be configured as an R1-R2 pair for bidirectional remote replication in a manner similar to that as described herein with respect to cluster LUNs 302 and 304. Cluster LUN C 822 may also be configured as the same logical device or LUN having the same LUN identity as cluster LUN's 302 and 304. In this manner, cluster LUNs 302, 304 and 306 may be maintained as synchronized copies of the same LUN. Writes to cluster LUN C 822 are replicated to LUN B 304 and then also to LUN A 302 by the remote replication configuration defined using the two R1-R2 pairs (e.g., cluster LUNs A and B denoting a first R1-R2 pair and cluster LUNs B and C denoting the second R1-R2 pair). In a similar manner, writes to any one of the 3 cluster LUNs 302, 304 and 822 are automatically replicated to the other cluster LUNs. Data nodes 812, 814 write to the cluster LUN C 822, such as in connection with storing information that may be used for data node failure detection and also in connection with failover processing so that another data node of another remote system or site (e.g., data node in system 210 or 220). Such written information to LUN C 822 may be further replicated to cluster LUNs 302, 304.

In a manner similar to the virtual cluster LUN 402 described above in connection with cluster LUNs A 302 and B 304 for a virtual cluster spanning systems 210 and 220, the cluster LUNs A 302, B 304 and C 822 may be viewed as a single virtual cluster LUN 830 spanning systems 210, 220 and 810. In this example, the virtual cluster 802 is viewed as spanning 3 data storage systems 210, 220 and 810.

Additionally, data LUN X1 820 may be configured as part of an R1-R2 remote replication pair. In this example, LUN X1 820 may be configured as the same logical device or LUN as LUNs 710 and 712. Thus, LUNs 710, 712 and 820 are exposed and are logically configured as the same LUN. Additionally, LUNs 712 and 820 may be configured as another R1-R2 remote replication pair for bidirectional remote replication. In other words, LUNs 712 and 820 may be configured as another R1-R2 replication pair in a manner similar to the way in which LUNs 710 and 712 are configured as an R1-R2 remote replication pair as discussed above. In this manner, LUNs 710, 712 and 820 may be maintained as synchronous copies of the same LUN. To a host or other client, LUNs 710, 712 and 820 are exposed as the same data LUN providing storage for a file system. For example, LUN X 710 may be mounted as a first file system exposed through data node 212. LUN X" 712 may be mounted as a second file system exposed through data node 622. LUN X1 820 may be mounted as a third file system exposed through data node 812. In accordance with the techniques herein, the first, second and third file systems may be logically viewed and exposed to clients such as hosts as the same file system. A write to a file, for example, received at any one of the data nodes 212, 622, 812 is replicated, (e.g., using the configured R1-R2 pairs (LUN X 710, LUN X"712) and (LUN X 712", LUN X1 822) on the other ones of the data nodes 212, 622, 812.

In this example of FIG. 13, pairs of data nodes may be defined with a first data node from a first data storage system and a partner second data node from a second different data storage system. If any data node of the pair fails, its partner data node of the pair may take over processing for the failed data node of the pair. Three pairs of data nodes may be defined, for example, as follows: (data node 1 212, data node 3 622); (data node 2 214, data node 6 814); and data node 4 624, data node 5 812).

What will now be described are additional details regarding a cluster LUN. As generally described herein, the cluster LUN, such as the virtual cluster LUN 402, may include information used in detecting when a data node of the cluster has failed and also in connection with facilitating failover processing of the failed data node to another healthy functional data node. For simplicity of illustration, reference is made in following paragraphs to the embodiment described above such as in connection with FIG. 12 where the virtual cluster includes 2 data storage systems and 4 data nodes.

Figure 14:
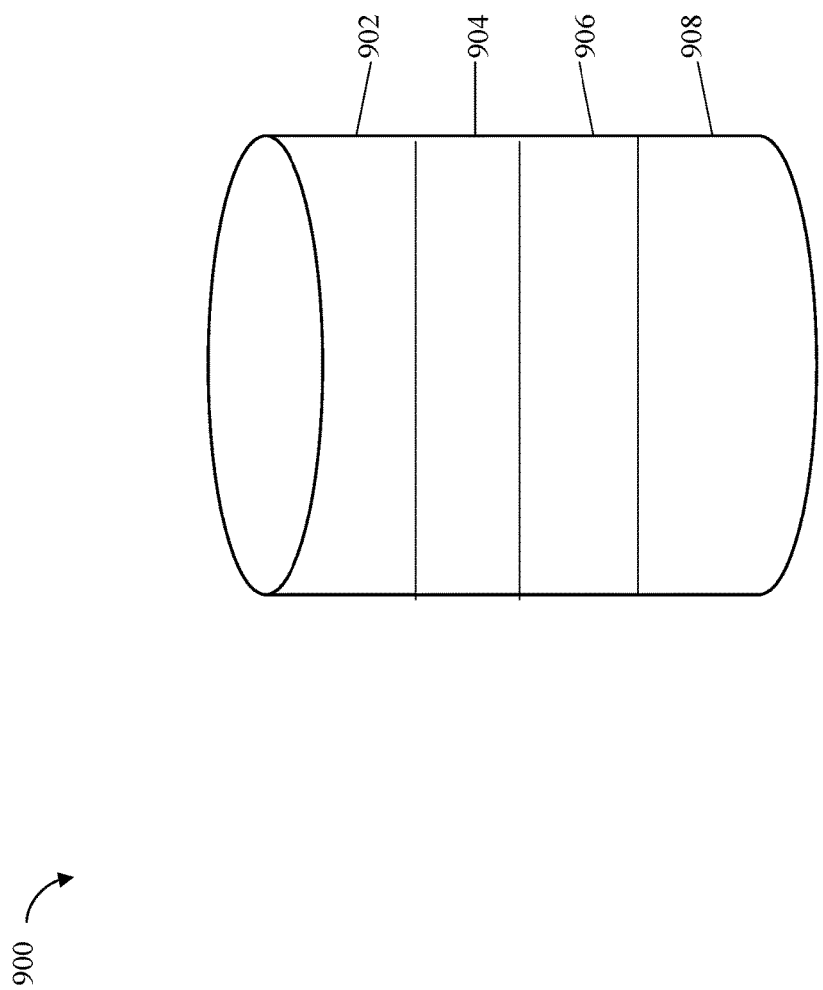
FIG. 14 is an example partitioning of the virtual cluster LUN in an embodiment in accordance with the techniques herein.

Referring to FIG. 14, shown is an example of a virtual cluster LUN that may be used in an embodiment in accordance with the techniques herein. The example 900 may denote the logical address space of the virtual cluster LUN 402. Thus, each of the cluster LUNs A302 and B 304 may be configured in the manner as described for the virtual cluster LUN 402.

The virtual cluster LUN 402 may be divided into 4 partitions 902, 904, 906 and 908. Each of the 4 data nodes of the cluster 602 may be assigned a different one of the 4 partitions. For example, data nodes 212, 214, 622 and 624 may be, respectively, assigned partitions 902, 904, 906 and 908. In at least one embodiment each data node may periodically write a timestamp to its assigned partition in an ongoing manner. The timestamp may denote the current time when the timestamp is written by the data node. The periodic writing of the timestamp by the data node may also be referred to herein as a periodic heartbeat of the data node denoting that the data node is still functional and running (e.g. not in a failure state). If a data node has not written a timestamp to its assigned partition within a specified amount of time, then the data node may be determined as a failed data node. In an embodiment using a cluster manager, the cluster manager may continually read the timestamps of the different partitions assigned to the different data nodes to determine when a data node has failed. For example, assume that each data node writes a new timestamp every 60 seconds to its assigned partition. The cluster manager may read the timestamps of the 4 partitions and detect that the last timestamp written by the data node 212 to its partition 902 was 5 minutes ago, which may be greater than a specified maximum time threshold. If the last timestamp written exceeds the maximum time threshold the cluster manager may determine that the data node 212 has failed and may then begin failover processing to have another one of the data nodes, such as data node 4 624, take over processing for the failed data node 212.

In an embodiment that does not use a cluster manager but rather has the data nodes perform self management, each of the data nodes may monitor the timestamp of its HA paired partner data node (e.g., data node pairs denoted by 702, 704). For example, data node 1 212 and data node 4 624 may be defined as one HA data node pair as denoted by 704. Each data node of the pair may monitor the partition of its partner data node to determine the last timestamp written by the partner data node. For example, data node 624 may monitor the partition 902 assigned to data node 212 and may detect that the last timestamp written by data node 212 exceeds the maximum time threshold. Thus, the data node 624 may determine that its partner data node 212 has failed and may perform processing to failover and takeover processing for the failed data node 212.

Other information written by each data node to its assigned partition may identify the data nodes HA partner data node. For example, partition 902 assigned to data node 212 may include information identifying data node 4 624 as the HA paired partner data node for data node 212. In an embodiment using a cluster manager, the cluster manager may use the foregoing HA partner data node information to identify the particular data node instructed to takeover processing of data node 212 upon failure of data node 212. In an embodiment performing self management of data nodes, the HA partner data node information stored in a data node's partition may be used by the data node to identify its partner and the partner's partition to monitor for failure. For example, the partition 908 assigned to the data node 624 may identify data node 212 as its HA partner data node and may identify the logical address corresponding to partition 902 for the data node 212. The data node 624 may use the foregoing information in its partition 908 to identify the logical address or location of the partition 902 for the data node 212 to be monitored for timestamp updates written by data node 212. If the data node 624 determines that the data node 212 has not written an updated timestamp to its partition 902 within the maximum time threshold, then the data node 624 may determine that data node 212 has failed and may takeover processing for the data node 212.

As noted elsewhere herein, a journal or log of writes may be maintained for each file system. When a write is made to a file system, the write may be stored in a record of the log file or journal. At a later point in time, the writes may be flushed from the log file where the writes are applied to the content stored on backend PDs. Each data node may store a log file in its partition for logged writes. If the data node fails, the other data node taking over processing for the failed data node may replay the log file of the failed data node to flush the logged writes to the backend PDs. In this manner, the log file stored in a data node's partition may be used in connection with failover processing performed by another healthy data node.

In at least one embodiment, the cluster manager may be a separate component as noted above. As a variation, the cluster manager may be a designated master one of the active or functional data nodes.

In an embodiment in accordance with the techniques herein with reference to FIG. 12, each of the cluster LUNs 302 and 304 may include the 4 partitions as illustrated in the example 900. Data node 1 212 may write to its assigned partition 902. For example, data node 212 may write its timestamps periodically to partition 902 and may store a log file of file system writes to be flushed to the backend PDs on the partition 902. Such information written by the data node 212 to the partition 902 on cluster LUN A 302 may be replicated to cluster LUN B 304. In an embodiment having self management, the partner data node 624 may read the information in partition 902 of data node 212 to monitor the timestamps written by data node 212 and determine whether or not the data node 212 has failed. If the data node 624 detects failure of the data node 212, the data node 624 may perform processing including replaying the log file of writes of the data node 212 also stored the partition 902.

It should be noted that described above are embodiments in which the HA data node pairings, such as denoted by 702 and 704, may be predetermined. As a variation, when a failed data node is detected, the remaining data nodes (if self managed) or a cluster manager may use a dynamic selection technique to select one of the remaining data nodes to take over the failed data node. For example, the data node selected to take over the failed data node may be performed using a random selection of the remaining active data nodes, using a round robin technique to select one of the remaining active data nodes, and the like.

Generally, the virtual cluster LUN, and thus the cluster LUNs of the systems included in the virtual cluster, may include information used to determine when a data node has failed, identify the failed data node, and decide which data node takes over for the failed data node. Additionally, the virtual cluster LUN, and thus the cluster LUNs of the systems included in the virtual cluster, may include sufficient state information about a failed data node to allow another active or healthy data node to takeover processing for the failed data node. In an embodiment in which the data nodes are file servers, such failover processing performed by an active or healthy data node may include first replaying a log file of the failed data node. The log file may include the writes directed to one or more particular file systems that had been exposed through the failed data node to hosts or other clients (e.g. data LUNs exposed or exported through the failed data node may have been mounted as file systems by hosts or other clients that issued writes to the file systems). Once the log file for the one or more particular file systems has been replayed, the active or healthy data node taking over for the failed node may then export or expose the file systems (e.g., the data LUNs provisioned for the file systems may be exposed or exported through the healthy data node and hosts or other clients may now mount the data LUNs as file systems through the healthy data node). In this manner, a client may now direct writes to the to file systems to the healthy data node.

In at least one embodiment in accordance with the techniques herein as described above in which a cluster manager is utilized, the cluster manager may be characterized as spoofed, tricked or deceived into believing that there is only a single virtual cluster (which the cluster manager perceives as a single data storage system) when in fact there are two different data storage systems (e.g., the single virtual cluster stretches across two physical systems as opposed to a single physical system). In such an embodiment, existing cluster manager software (configured to operate with only a single system as the single virtual cluster) may be used in connection with the techniques herein without modification to achieve intersite HA of data nodes where the virtual cluster includes multiple physical systems.

Figure 15A:
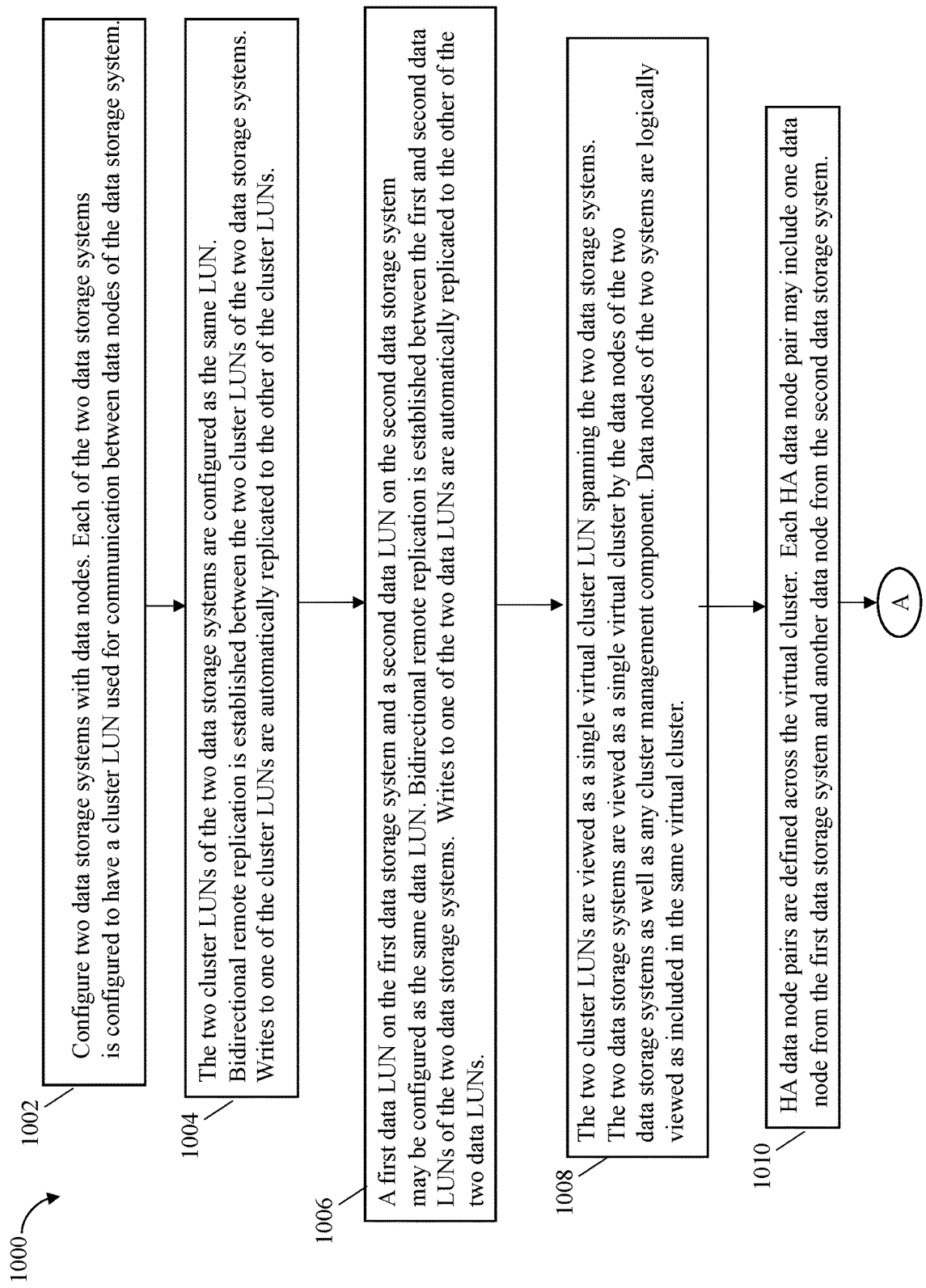
FIGS. 15A and 15B are flowcharts of processing steps that may be performed in an embodiment in accordance with the techniques herein.
Figure 15B:
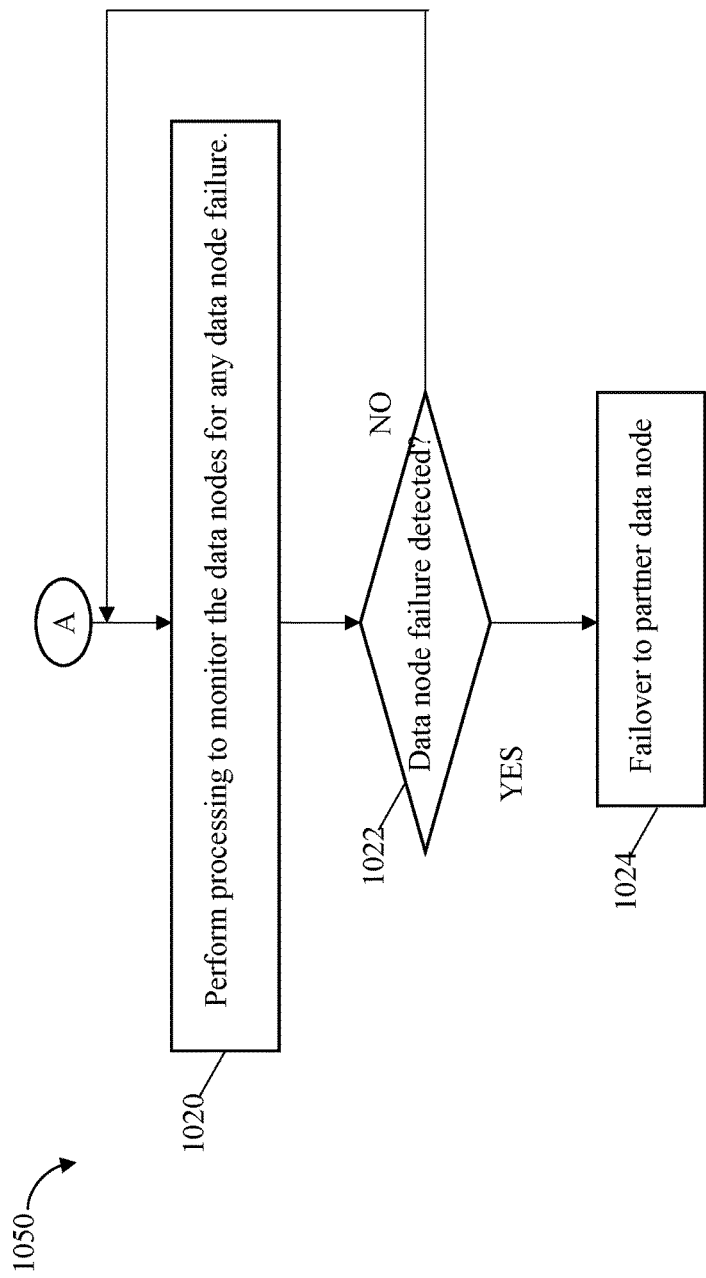

Referring to FIGS. 15A and 15B, shown is a flowchart of processing steps that may be performed in an embodiment in accordance with the techniques herein. The flowchart 1000 summarizes processing as described above that may be performed in connection with configuring a virtual cluster spanning two data storage systems. As also discussed above, the techniques and processing as described herein may more generally be applied for use in a virtual cluster spanning more than two data storage systems.

At the step 1002, the two data storage systems are configured to have data nodes. The data nodes may be processors upon which applications, such as file servers, execute in the context of VMs on processosr of the data storage systems. Thus, in at least one embodiment as described herein, the data nodes may be file servers providing file-based services. In the step 1002, each of the data storage systems is also configured to have a cluster LUN used for communication between data nodes of that data storage system. From the step 1002, control proceeds to the step 1004.

At the step 1004, the two cluster LUNs of the two data storage systems are configured as the same LUN. Bidirectional remote replication is established between the two cluster LUNs of the two data storage systems. Writes to one of the cluster LUNs are automatically replicated to the other of the cluster LUNs. From the step 1004, control proceeds to the step 1006.

At the step 1006, a first data LUN on the first data storage system and a second data LUN on the second data storage system may be configured as the same data LUN. Bidirectional remote replication is established between the first and second data LUNs of the two data storage systems. Writes to one of the two data LUNs are automatically replicated to the other of the two data LUNs. From the step 1006, control proceeds to the step 1008.

At the step 1008, the two cluster LUNs are viewed as a single virtual cluster LUN spanning the two data storage systems. The two data storage systems are viewed as a single virtual cluster by the data nodes of the two data storage systems as well as any cluster management component. Data nodes of the two systems are logically viewed as included in the same virtual cluster. In an embodiment having a cluster manager on the first system or where one of the data nodes of the first system is the designated master data node performing cluster management, network connectivity is established between the cluster manager or the designated master data node of the first data storage system and data nodes of the second remote data storage system. From the step 1008, control proceeds to the step 1010.

Each data node may also be paired with a HA data node within the single virtual cluster. Thus, at the step 1010, HA data node pairs are defined across the virtual cluster. In at least one embodiment, each HA data node pair may include one data node from the first data storage system and another data node from the second data storage system. As a variation, at least one of the HA data node pairs may include both data nodes within the same data storage system. In this manner, for each HA data node pair, when one data node of the pair fails, failover processing may be performed to the other remaining data node (e.g., healthy, functional data node) of the pair whereby the other remaining data node of the pair may subsequently takeover processing for the failed data node. From the step 1010, control proceeds to the step 1020.

At the step 1020, processing is performed to monitor the data nodes for any data node failure. From the step 1020, control proceeds to the step 1022. At the step 1022, a determination is made as to whether there is a failed data node detected. If the step 1022 evaluates to no, control proceeds to the step 1020. If the step 1022 evaluates to yes, control proceeds to the step 1024. At the step 1024, processing is performed to failover to another active or healthy data node, such as the partner data node. The partner data node may perform handle or service any subsequent requests that may have otherwise been directed to the failed data node. The particular processing performed in connection with the step 1024 may vary with embodiment. For example, in one embodiment described herein where the data nodes are file servers, the logged writes that have not yet been flushed from the failed data node's log file to the backend PDs may be performed. The failed data node may have exported or exposed data LUNs that were previously mounted by clients as file systems. The logged writes of the replayed log are writes directed to such file systems. Subsequent to replaying the failed data node's log file of logged writes directed to the file systems exposed through the failed data node, the partner data node may then expose or export data LUNs that are then mounted as file systems by the clients. In this manner, the data LUNs and the file systems exposed through the failed data node may now be exposed through the partner data node so that clients may direct subsequent I/Os to the file systems to the partner data node.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of creating and using a virtual cluster of a plurality of data storage systems comprising:
    creating a first cluster logical device on a first of the plurality of data storage systems including a first plurality of data nodes;
    creating a second cluster logical device on a second of the plurality of data storage systems including a second plurality of data nodes;
    configuring the first cluster logical device and the second cluster logical device as a same first logical device;
    establishing bidirectional remote replication between the first cluster logical device and the second cluster logical device;
    determining a plurality of pairs of data nodes, wherein each pair of the plurality of pairs includes a one data node from the first data storage system and another data node from the second data storage system;
    determining a failure of a first data node on the first data storage system, wherein one of the plurality of pairs of data nodes includes the first data node and a second data node of the second data storage system; and
    responsive to determining the failure of the first data node, performing failover processing by the second data node, wherein the first cluster logical device and the second cluster logical device are logically viewed by the first plurality of data nodes on the first data storage system and by the second plurality of data nodes on the second data storage system as a single virtual cluster logical device, wherein the single virtual cluster logical device includes a plurality of partitions, wherein each data node of the first plurality of data nodes and the second plurality of data nodes is assigned a different one of the plurality of partitions including state information regarding said each data node, and wherein each data node of the first plurality of data nodes and the second plurality of data nodes has read and write access to the single virtual cluster logical device, and wherein each data node of the first plurality of data nodes and the second plurality of data nodes periodically writes a timestamp to one of the plurality of partitions assigned to said each data node, and
    wherein said determining the failure of the first data node on the first data storage system includes determining that the first data node has not written a timestamp within a specified maximum amount of time to a first of the plurality of partitions of the single virtual cluster logical device assigned to the first data node.

2. The method of claim 1, wherein the first cluster logical device and the second cluster logical device are logically viewed by a cluster manager component on the first data storage system as the single virtual cluster logical device.

3. The method of claim 1, wherein the first plurality of nodes of the first data storage system and the second plurality of nodes of the second data storage system are included in the virtual cluster.

4. The method of claim 3, wherein the first plurality of data nodes and the second plurality of data nodes are file servers executing in a context of virtual machines on processors of the first data storage system and the second data storage system.

5. The method of claim 4, wherein a log file of the first data node is stored in the first partition of the virtual cluster logical device assigned to the first data node, and wherein the failover processing performed by the second data node includes:
  reading the log file from the first partition assigned to the first data node; and
  replaying the log file of the first data node stored in the first partition of the virtual cluster logical device configured as the same first logical device as the second cluster logical device.

6. The method of claim 5, wherein the log file includes a plurality of logged write operations having write data that has not yet been written to physical storage, and wherein replaying the log file includes writing out the write data of the plurality of logged write operations to physical storage.

7. The method of claim 5, wherein one or more logical devices are exported through the first data node prior to failure, and the one or more logical devices provide storage for one or more file systems mounted by a host.

8. The method of claim 7, wherein the log file includes a write operation that writes first data to a file in a first of the file systems mounted by the host, and wherein prior to failure of the first data node, the host sends the write operation to the first data node.

9. The method of claim 8, wherein the failover processing performed by the second data node includes:
  exporting the one or more logical devices through the second data node.

10. The method of claim 9, wherein subsequent to the second data node completing the failover processing, the one or more logical devices exported through the second data node are mounted by the host as the one or more file systems by the host.

11. A system comprising:
  one or more processors; and
  a memory comprising code stored thereon that, when executed by at least a first of the one or more processors, performs a method of creating and using a virtual cluster of a plurality of data storage systems comprising:
    creating a first cluster logical device on a first of the plurality of data storage systems including a first plurality of data nodes;
    creating a second cluster logical device on a second of the plurality of data storage systems including a second plurality of data nodes;
    configuring the first cluster logical device and the second cluster logical device as a same first logical device;
    establishing bidirectional remote replication between the first cluster logical device and the second cluster logical device;
    determining a plurality of pairs of data nodes, wherein each pair of the plurality of pairs includes a one data node from the first data storage system and another data node from the second data storage system;
    determining a failure of a first data node on the first data storage system, wherein one of the plurality of pairs of data nodes includes the first data node and a second data node of the second data storage system; and
    responsive to determining the failure of the first data node, performing failover processing by the second data node, wherein the first cluster logical device and the second cluster logical device are logically viewed by the first plurality of data nodes on the first data storage system and by the second plurality of data nodes on the second data storage system as a single virtual cluster logical device, wherein the single virtual cluster logical device includes a plurality of partitions, wherein each data node of the first plurality of data nodes and the second plurality of data nodes is assigned a different one of the plurality of partitions including state information regarding said each data node, and wherein each data node of the first plurality of data nodes and the second plurality of data nodes has read and write access to the single virtual cluster logical device, and wherein each data node of the first plurality of data nodes and the second plurality of data nodes periodically writes a timestamp to one of the plurality of partitions assigned to said each data node, and
    wherein said determining the failure of the first data node on the first data storage system includes determining that the first data node has not written a timestamp within a specified maximum amount of time to a first of the plurality of partitions of the single virtual cluster logical device assigned to the first data node.

12. A non-transitory computer readable medium comprising code stored thereon that, when executed, performs a method of creating and using a virtual cluster of a plurality of data storage systems comprising:
  creating a first cluster logical device on a first of the plurality of data storage systems including a first plurality of data nodes;
  creating a second cluster logical device on a second of the plurality of data storage systems including a second plurality of data nodes;
  configuring the first cluster logical device and the second cluster logical device as a same first logical device;
  establishing bidirectional remote replication between the first cluster logical device and the second cluster logical device;
  determining a plurality of pairs of data nodes, wherein each pair of the plurality of pairs includes a one data node from the first data storage system and another data node from the second data storage system;
  determining a failure of a first data node on the first data storage system, wherein one of the plurality of pairs of data nodes includes the first data node and a second data node of the second data storage system; and
  responsive to determining the failure of the first data node, performing failover processing by the second data node, wherein the first cluster logical device and the second cluster logical device are logically viewed by the first plurality of data nodes on the first data storage system and by the second plurality of data nodes on the second data storage system as a single virtual cluster logical device, wherein the single virtual cluster logical device includes a plurality of partitions, wherein each data node of the first plurality of data nodes and the second plurality of data nodes is assigned a different one of the plurality of partitions including state information regarding said each data node, and wherein each data node of the first plurality of data nodes and the second plurality of data nodes has read and write access to the single virtual cluster logical device, and wherein each data node of the first plurality of data nodes and the second plurality of data nodes periodically writes a timestamp to one of the plurality of partitions assigned to said each data node, and wherein said determining the failure of the first data node on the first data storage system includes determining that the first data node has not written a timestamp within a specified maximum amount of time to a first of the plurality of partitions of the single virtual cluster logical device assigned to the first data node.

13. The non-transitory computer readable medium of claim 12, wherein the first cluster logical device and the second cluster logical device are logically viewed by a cluster manager component on the first data storage system as the single virtual cluster logical device.

14. The non-transitory computer readable medium of claim 12, wherein the first plurality of nodes of the first data storage system and the second plurality of nodes of the second data storage system are included in the virtual cluster.

* * * * *